(12) United States Patent
Nishi

(10) Patent No.: US 8,743,704 B2
(45) Date of Patent: Jun. 3, 2014

(54) MONITORING APPARATUS, MONITORING METHOD, AND MONITORING PROGRAM

(75) Inventor: Tetsuya Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 494 days.

(21) Appl. No.: 13/010,404

(22) Filed: Jan. 20, 2011

(65) Prior Publication Data

US 2011/0235525 A1 Sep. 29, 2011

(30) Foreign Application Priority Data

Mar. 24, 2010 (JP) .................................. 2010-67836

(51) Int. Cl.
 *H04L 12/26* (2006.01)
(52) U.S. Cl.
 USPC ........................... 370/242; 370/237; 370/392
(58) Field of Classification Search
 USPC .......................... 370/254–230, 237, 242, 392
 See application file for complete search history.

(56) References Cited

U.S. PATENT DOCUMENTS

| | | | |
|---|---|---|---|
| 6,567,382 B1 * | 5/2003 | Cox .............................. | 370/255 |
| 6,987,735 B2 * | 1/2006 | Basso et al. ................... | 370/238 |
| 7,190,696 B1 * | 3/2007 | Manur et al. ................... | 370/392 |
| 7,623,519 B2 * | 11/2009 | Tornetta et al. ............... | 370/392 |
| 8,611,251 B2 * | 12/2013 | Subramanian et al. ........ | 370/254 |
| 8,630,297 B2 * | 1/2014 | Subramanian et al. ........ | 370/400 |
| 2003/0002443 A1 * | 1/2003 | Basso et al. ................... | 370/237 |
| 2006/0056384 A1 | 3/2006 | Ishii et al. | |
| 2006/0176819 A1 * | 8/2006 | Charzinski et al. ........... | 370/238 |
| 2006/0190620 A1 | 8/2006 | Kobayashi | |
| 2006/0198695 A1 * | 9/2006 | Kano et al. ................... | 403/408.1 |
| 2006/0203720 A1 * | 9/2006 | Kano ............................. | 370/228 |
| 2006/0215546 A1 * | 9/2006 | Tochio ........................... | 370/218 |
| 2006/0250951 A1 * | 11/2006 | Ueda et al. .................... | 370/217 |
| 2007/0070893 A1 * | 3/2007 | Butenweg et al. ............. | 370/230 |
| 2008/0175269 A1 * | 7/2008 | Alvarez et al. ................ | 370/468 |
| 2008/0225699 A1 * | 9/2008 | Lee ................................ | 370/218 |
| 2008/0232347 A1 * | 9/2008 | Chao et al. .................... | 370/351 |
| 2009/0116488 A1 * | 5/2009 | Schollmeier et al. ......... | 370/392 |
| 2010/0185762 A1 | 7/2010 | Yasuie et al. | |
| 2010/0290458 A1 * | 11/2010 | Assarpour ..................... | 370/389 |

FOREIGN PATENT DOCUMENTS

| | | |
|---|---|---|
| JP | 2006-86889 | 3/2006 |
| JP | 2006-229421 | 8/2006 |
| JP | 2006-238052 | 9/2006 |

* cited by examiner

*Primary Examiner* — Edan Orgad
*Assistant Examiner* — Emmanuel Maglo
(74) *Attorney, Agent, or Firm* — Staas & Halsey LLP

(57) ABSTRACT

A monitoring apparatus that identifies a failure path in a network including a relay device includes a packet receiving unit configured to receive packets that are transmitted in the network and an identification unit configured to, when deterioration of quality is detected between a transmission source subnetwork and a destination subnetwork of the received packet based on information included in the received packet received by the packet receiving unit, perform a quality measurement on a plurality of packets that are estimated to be routed through different paths among a plurality of transmission paths between the transmission source subnetwork and the destination subnetwork based on a transmission source address or a destination address so as to identify which packet is a packet that is routed through the failure path.

15 Claims, 25 Drawing Sheets

FIG. 5

| TRANSMISSION SOURCE SUBNETWORK | DESTINATION SUBNETWORK | PATH |
|---|---|---|
| 10.0.0.0/8 | 12.0.0.0/8 | A→C→E→G→I |
| 10.0.0.0/8 | 13.0.0.0/8 | A→C→E→G→H→J |
| | | A→C→D→F→H→J |
| 11.0.0.0/8 | 12.0.0.0/8 | B→D→C→E→G→I |
| | | B→D→F→H→G→I |
| 11.0.0.0/8 | 13.0.0.0/8 | B→D→F→H→J |

FIG. 8
UDP HEADER (8 BYTES)
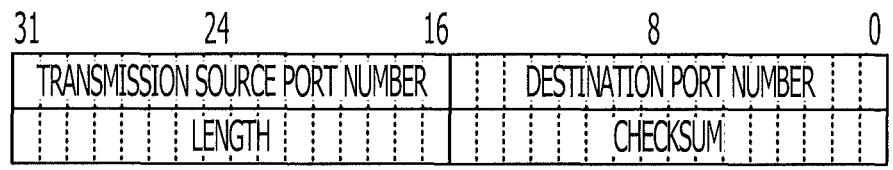
RTP HEADER (8 BYTES)
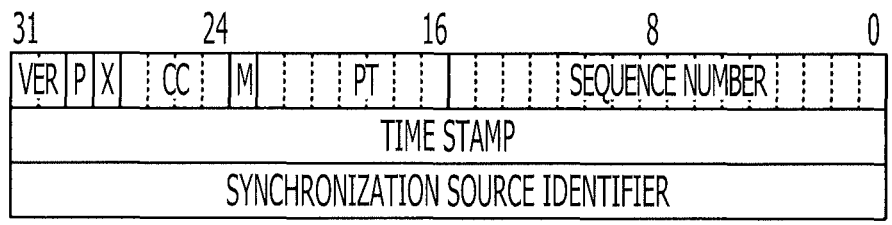
P: PADDING, X: EXTENSION, CC: CSRC COUNT, M: MARKER

FIG. 9

| TRANSMISSION SOURCE SUBNETWORK | DESTINATION SUBNETWORK | NUMBER OF TRANSMITTED PACKETS | NUMBER OF RECEIVED PACKETS | NUMBER OF LOST PACKETS ON TRANSMISSION SIDE | NUMBER OF LOST PACKETS ON RECEIVING SIDE | QUALITY MEASUREMENT RESULT |
|---|---|---|---|---|---|---|
| 10.0.0.0/8 | 12.0.0.0/8 | 10000 | 10000 | 100 | 100 | 1 |
| 10.0.0.0/8 | 13.0.0.0/8 | 9000 | 9000 | 100 | 100 | 1 |
| 11.0.0.0/8 | 12.0.0.0/8 | 10500 | 10500 | 300 | 300 | 1 |
| 11.0.0.0/8 | 13.0.0.0/8 | 11000 | 11000 | 0 | 0 | 0 |

| TRANSMISSION SOURCE SUBNETWORK | DESTINATION SUBNETWORK | MODULO (n) | TRANSMISSION SOURCE IP ADDRESS/DESTINATION IP ADDRESS | QUALITY MEASUREMENT RESULT | QUALITY DETERIORATION PATH |
|---|---|---|---|---|---|
| 10.0.0.0/8 | 13.0.0.0/8 | 0 | 10.0.0.1/13.0.0.2 | 0 | |
| | | 1 | 10.0.0.4/13.0.0.6 | 1 | A→C→E→G→H→J |

| TRANSMISSION SOURCE SUBNETWORK | DESTINATION SUBNETWORK | MODULO (n) | NUMBER OF TRANSMITTED PACKETS | NUMBER OF RECEIVED PACKETS | NUMBER OF LOST PACKETS ON TRANSMISSION SIDE | NUMBER OF LOST PACKETS ON RECEIVING SIDE |
|---|---|---|---|---|---|---|
| 10.0.0.0/8 | 13.0.0.0/8 | 0 | 10000 | 10000 | 0 | 0 |
| | | 1 | 9000 | 9000 | 100 | 100 |

| TRANSMISSION SOURCE IP ADDRESS | DESTINATION IP ADDRESS | NUMBER OF TRANSMITTED PACKETS | NUMBER OF RECEIVED PACKETS | NUMBER OF LOST PACKETS ON TRANSMISSION SIDE | NUMBER OF LOST PACKETS ON RECEIVING SIDE | QUALITY MEASUREMENT RESULT |
|---|---|---|---|---|---|---|
| 10.0.0.1 | ... | ... | ... | ... | ... | ... |
| 10.0.0.1 | 13.0.0.2 | 1000 | 1000 | 0 | 0 | 0 |
| ... | ... | ... | ... | ... | ... | ... |
| 10.0.0.3 | 13.0.0.4 | 1050 | 1050 | 0 | 0 | 0 |
| ... | ... | ... | ... | ... | ... | ... |
| 10.0.0.4 | 13.0.0.6 | 900 | 900 | 10 | 10 | 1 |
| ... | ... | ... | ... | ... | ... | ... |
| 10.0.0.6 | 13.0.0.8 | 1100 | 1100 | 30 | 30 | 1 |
| ... | ... | ... | ... | ... | ... | ... |
| 11.0.0.1 | ... | ... | ... | ... | ... | ... |
| ... | ... | ... | ... | ... | ... | ... |

| TRANSMISSION SOURCE SUBNETWORK | DESTINATION SUBNETWORK | MODULO (n) | TRANSMISSION SOURCE IP ADDRESS/DESTINATION IP ADDRESS | QUALITY MEASUREMENT RESULT | QUALITY DETERIORATION PATH |
|---|---|---|---|---|---|
| 10.0.0.0/8 | 13.0.0.0/8 | 0 | 10.0.0.1/13.0.0.2 | 0 | |
| | | 1 | 10.0.0.4/13.0.0.6 | 1 | A→C→E→G→H→J |

| TRANSMISSION SOURCE SUBNETWORK | DESTINATION SUBNETWORK | PATH |
|---|---|---|
| 10.0.0.0/8 | ... | ... |
| 10.0.0.0/8 | 15.0.0.0/8 | A→D→G→H→I→L |
| | | A→D→E→H→I→L |
| | | A→D→E→F→I→L |
| 11.0.0.0/8 | ... | ... |
| ... | ... | ... |

FIG. 21

| TRANSMISSION SOURCE SUBNETWORK | DESTINATION SUBNETWORK | NUMBER OF TRANSMITTED PACKETS | NUMBER OF RECEIVED PACKETS | NUMBER OF LOST PACKETS ON TRANSMISSION SIDE | NUMBER OF LOST PACKETS ON RECEIVING SIDE | QUALITY MEASUREMENT RESULT |
|---|---|---|---|---|---|---|
| 10.0.0.0/8 | ... | ... | ... | ... | ... | ... |
| 10.0.0.0/8 | 15.0.0.0/8 | 15000 | 15000 | 400 | 400 | 1 |
| 11.0.0.0/8 | ... | ... | ... | ... | ... | ... |
| ... | ... | | | | | |

| TRANSMISSION SOURCE SUBNETWORK | DESTINATION SUBNETWORK | MODULO (n) | TRANSMISSION SOURCE IP ADDRESS/DESTINATION IP ADDRESS | QUALITY MEASUREMENT RESULT | QUALITY DETERIORATION PATH |
|---|---|---|---|---|---|
| 10.0.0.0/8 | 15.0.0.0/8 | 0 | 10.0.0.1/15.0.0.2 | 0 | |
| | | 1 | 10.0.0.2/15.0.0.3 | 0 | |
| | | 2 | 10.0.0.1/15.0.0.1 | 1 | A→D→G→H→I→L |

| TRANSMISSION SOURCE SUBNETWORK | DESTINATION SUBNETWORK | MODULO (n) | NUMBER OF TRANSMITTED PACKETS | NUMBER OF RECEIVED PACKETS | NUMBER OF LOST PACKETS ON TRANSMISSION SIDE | NUMBER OF LOST PACKETS ON RECEIVING SIDE |
|---|---|---|---|---|---|---|
| 10.0.0.0/8 | 15.0.0.0/8 | 0 | 10000 | 10000 | 0 | 0 |
| | | 1 | 11000 | 11000 | 0 | 0 |
| | | 2 | 9500 | 9500 | 100 | 100 |

| TRANSMISSION SOURCE SUBNETWORK | DESTINATION SUBNETWORK | PATH |
|---|---|---|
| 10.0.0.0/8 | 12.0.0.0/8 | A→C→E→G→I |
| 10.0.0.0/8 | 13.0.0.0/8 | A→C→E→G→H→J |
| | | A→C→D→F→H→J |
| 11.0.0.0/8 | 12.0.0.0/8 | B→D→C→E→G→I |
| | | B→D→F→H→G→I |
| 11.0.0.0/8 | 13.0.0.0/8 | B→D→F→H→J |

MONITORING APPARATUS, MONITORING METHOD, AND MONITORING PROGRAM

CROSS-REFERENCE TO RELATED APPLICATIONS

This application is based upon and claims the benefit of priority of the prior Japanese Patent Application No. 2010-67836, filed on Mar. 24, 2010, and the entire contents of which are incorporated herein by reference.

FIELD

The embodiments discussed herein are related to a monitoring apparatus, a monitoring method, and a monitoring program that identify a failure path in a network.

BACKGROUND

In general, as one of protocols for performing path control of an IP network, an open shortest path first (OSPF) protocol has been used. In OSPF, routers exchange path control information called link state advertisement (LSA) with one another, thereby constructing a routing table so as to perform path control. LSA has information on cost, which serves as a determination criterion for determining a path when each router constructs a routing table.

In a routing protocol, such as OSPF, each router determines a path in an IP network by using information, such as information on cost that is calculated based on the bandwidth of a line, and the like as a determination criterion. For example, each router derives a path for which the cost of a path through which information transmitted from a transmission source to a destination passes is minimized, and sets the derived path in a routing table, thereby determining a path in the IP network.

Depending on the scale and configuration of an IP network, there are cases in which a plurality of paths each having cost (for example, a minimum cost) serving as a determination criterion for determining a path exist. Such paths form what is called an equal cost multi path (ECMP).

When a routing table is to be constructed, in the case that information that is transmitted from the transmission source to the destination passes through an ECMP, each router sets, in the routing table, a plurality of paths that constitute an ECMP as paths corresponding to flows from the transmission source to the destination. Then, when the information from the transmission source to the destination, which passes through the ECMP, is transmitted, each router determines a path through which the information passes from among a plurality of paths constituting an ECMP based on a certain rule for routing the path.

FIG. 24 illustrates an example of the configuration of a typical IP network.

FIG. 25 illustrates a routing table T5 in a typical IP network 100 illustrated in FIG. 24.

In the IP network 100 illustrated in FIG. 24, reference characters A to J denote relay devices, such as routers.

The numerical values positioned between the routers, illustrated in FIG. 24, denote costs between the routers. Furthermore, each of the routers A to J generates a routing table based on information, such as cost included in the LSA exchanged between the routers.

For example, in the configuration of the IP network 100 illustrated in FIG. 24, each of the routers A to J sets a path in the routing table T5 illustrated in FIG. 25 so that the flow from the subnetwork 10.0.0.0/8 to the subnetwork 12.0.0.0/8 passes through the path A→C→E→G→I in which the cost is a minimum (40).

Furthermore, each of the routers A to J sets a path in the routing table T5 so that the flow from the subnetwork 10.0.0.0/8 to the subnetwork 13.0.0.0/8 passes through either the path A→C→E→G→H→J or the path A→C→D→F→H→J, in which the cost is a minimum (70).

At this time, the path A→C→E→G→H→J and the path A→C→D→F→H→J are paths of ECMP.

Hereinafter, similarly, the path of each flow is set based on LSA for each of a transmission source subnetwork and a destination subnetwork.

A failure path monitoring apparatus (apparatus for monitoring a path) 110 illustrated in FIG. 24 is an apparatus that is disposed in the IP network 100 and that monitors data transmitted in the IP network 100 so as to identify the path in which a failure has occurred when the quality of data has deteriorated.

Here, whether the data that is transmitted from the subnetwork 10.0.0.0/8 to the subnetwork 13.0.0.0/8 actually passes through one of the paths of the ECMP, in the manner described above, depends on a certain rule for routing the path in the routers A to J. As described above, the routing of the path in each of the routers A to J is determined inside the routers A to J. Therefore, it is difficult to easily identify which one of the paths of ECMP the data passes through based on the information included in the data that passes through the ECMP of the IP network 100.

For example, when a failure occurs in a section of an ECMP in the IP network 100 and the quality of the flow from the subnetwork 10.0.0.0/8 to the subnetwork 13.0.0.0/8 deteriorates, the failure path monitoring apparatus 110 determines the path through which the data in which the deterioration of quality has occurred passed in order to identify the path in which the failure has occurred.

For this purpose, the failure path monitoring apparatus 110 determines the path through which the data passed by referring to, for example, the routing table T5 based on the information of the transmission source subnetwork 10.0.0.0/8 and the destination subnetwork 13.0.0.0/8 of the data in which the deterioration of quality has occurred.

Then, the failure path monitoring apparatus 110 obtains, based on the routing table T5, information indicating that the data transmitted from the subnetwork 10.0.0.0/8 to the subnetwork 13.0.0.0/8 passed through one of the path A→C→E→G→H→J and the path A→C→D→F→H→J.

As described above, the failure path monitoring apparatus 110 monitors the data that is transmitted in the IP network 100 and determines that the path through which the data passed is an ECMP by referring to the routing table T5.

However, in the manner described above, the routing of the path in each of the routers A to J is determined inside the routers A to J.

Therefore, it is difficult for the failure path monitoring apparatus 110 to easily identify which one of the ECMPs the data in which the deterioration of quality has occurred passed through actually based on the information included in the data that passed through the ECMP of the IP network 100.

As a result of the above, when the quality of data deteriorates in a path of an ECMP, it is desired to quickly identify the path in which the deterioration of quality has occurred.

Hitherto, in order to identify a path in which the quality of data has deteriorated in an ECMP, the failure path monitoring apparatus 110 has performed a path search, such as traceroute, for each IP address between the transmission source subnetwork and the destination subnetwork of the data in which the deterioration of quality has occurred. Then, the failure path monitoring apparatus 110 has confirmed which path the flow of each of the transmission source IP address and the destination IP address in the transmission source subnetwork and the destination subnetwork of the data in which the deterioration of quality has occurred passed through, and has performed a quality measurement on each flow for which the passed path has been confirmed, thereby identifying the path in which the deterioration of quality has occurred.

There is a known method in which, in order to identify a failure occurrence place in the path of a communication network, a monitoring apparatus obtains quality information for each flow from each terminal that exists in the communication network, and estimates a quality deterioration place by using various algorithms based on path information obtained from a router or the like.

There is another known method in which a monitoring apparatus generates a table indicating a hierarchical structure based on a network topology, and finds a branch at which a failure has been detected in all the terminals on the lower layer side based on this table and information on the failure detection place, thereby estimating the branch as a failure occurrence place.

However, in the above-described technique for identifying a path in which the deterioration of quality of the data has occurred in an ECMP, since traceroute is performed for each of a transmission source IP address and a destination IP address, much time is taken to identify the path for each IP address. Furthermore, in the path in which the quality of data has deteriorated, there is a case in which the execution result of traceroute cannot be received.

On the other hand, in the known technique described above for identifying a failure occurrence place in the path of the communication network, in an IP network in which OSPF is used, it is difficult to easily identify a failure path in the ECMP section.

SUMMARY

According to a certain aspect of the invention, a monitoring apparatus that identifies a failure path in a network including a relay device includes a packet receiving unit configured to receive packets that are transmitted in the network and an identification unit configured to, when deterioration of quality is detected between a transmission source subnetwork and a destination subnetwork of the received packet based on information included in the received packet received by the packet receiving unit, perform a quality measurement on a plurality of packets that are estimated to be routed through different paths among a plurality of transmission paths between the transmission source subnetwork and the destination subnetwork based on a transmission source address or a destination address so as to identify which packet is a packet that is routed through the failure path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a routing table in the IP network illustrated in FIG. 4, which is generated and managed by a topology/path management unit of the failure path monitoring apparatus of the first embodiment;

FIG. 8 illustrates examples of header formats of a UDP header and an RTP header in the IP network of the first embodiment;

FIG. 9 illustrates an example of a quality measurement result table that is generated and updated by a quality measurement unit of the failure path monitoring apparatus of the first embodiment;

FIG. 12 illustrates an example of a search path candidate table that is generated by the ECMP path determination unit of the failure path monitoring apparatus of the first embodiment;

FIG. 13 illustrates an example of a quality measurement result table for each modulo generated by the ECMP path determination unit of the failure path monitoring apparatus of the first embodiment;

FIG. 17 illustrates an example of a quality measurement result table that is generated and updated by a quality measurement unit of the failure path monitoring apparatus of the second embodiment;

FIG. 18 illustrates an example of a search path candidate table that is generated by an ECMP path determination unit of the failure path monitoring apparatus of the second embodiment;

FIG. 20 illustrates an example of a routing table that is generated and managed by a topology/path management unit of the failure path monitoring apparatus with regard to the IP network illustrated in FIG. 19;

FIG. 21 illustrates an example of the quality measurement result table that is generated and updated by a quality measurement unit of the failure path monitoring apparatus with regard to the IP network illustrated in FIG. 19;

FIG. 22 illustrates an example of a search path candidate table that is generated by the ECMP path determination unit of the failure path monitoring apparatus with regard to the IP network illustrated in FIG. 19;

FIG. 23 illustrates an example of a quality measurement result table for each modulo generated by the ECMP path determination unit of the failure path monitoring apparatus with regard to the IP network illustrated in FIG. 19;

FIG. 25 illustrates an example of a routing table in the typical IP network illustrated in FIG. 24.

DETAILED DESCRIPTION OF EMBODIMENT(S)

Embodiments of the present invention will be described below with reference to the drawings.

(A) First Embodiment (A-1) Configuration of First Embodiment

Figure 1:
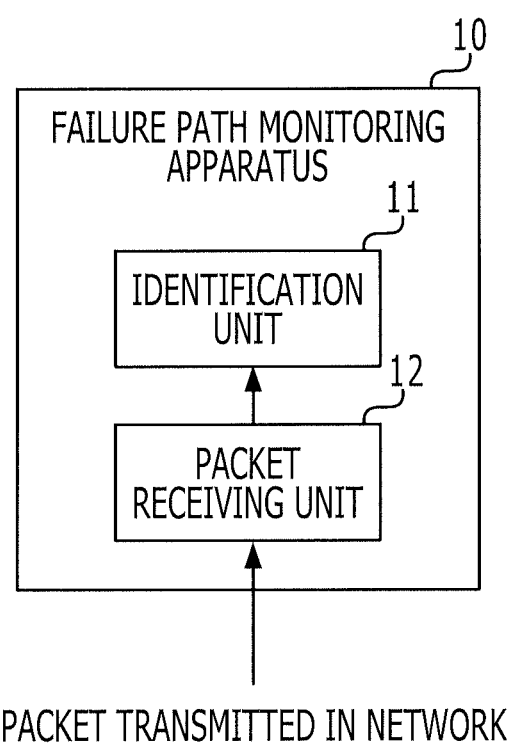
FIG. 1 illustrates an example of a failure path monitoring apparatus according to a first embodiment of the present invention.

FIG. 1 is a block diagram illustrating an example of the configuration of a failure path monitoring apparatus 10 according to a first embodiment of the present invention. The failure path monitoring apparatus (apparatus for monitoring a path) 10, which is disposed in a network including a relay device, includes an identification unit 11 and a packet receiving unit 12.

The packet receiving unit 12 receives packets that are transmitted in the network.

Based on the information included in the received packets received by the packet receiving unit 12, the identification unit 11 detects the deterioration of quality of the received packet between a transmission source subnetwork and a destination subnetwork. When the deterioration of the quality of the received packet is detected, the identification unit 11 estimates, based on the destination address and/or the transmission source address of the received packet, a plurality of packets in which the deterioration of quality has been detected, which are routed through mutually different paths among a plurality of transmission paths between the transmission source subnetwork and the destination subnetwork. Furthermore, the identification unit 11 performs quality measurement on the plurality of packets that are estimated to be routed through different paths, and identifies which packet is a packet that is routed through a failure path, thereby identifying the failure path in the network including the relay device.

As described above, the failure path monitoring apparatus 10 estimates a plurality of packets that are routed through mutually different paths from a plurality of packets that are transmitted from the transmission source subnetwork to the destination subnetwork, in which the deterioration of quality of the received packet has been detected, and performs quality measurement on the plurality of estimated packets. Then, the failure path monitoring apparatus 10 identifies which packet is a packet that is routed through the failure path based on the quality measurement result, the failure path in the network including the relay device.

Therefore, even when a plurality of transmission paths exist between the transmission source subnetwork and the destination subnetwork, in which the deterioration of quality of the received packet has been detected, a path search, such as traceroute, may not be performed for each of all the addresses between the transmission source subnetwork and the destination subnetwork, and it is possible to identify the path in which the deterioration of quality has occurred in a short time or accurately.

The technique for estimating a plurality of packets that are routed through different paths from a plurality of packets in which the deterioration of quality of the received packet has been detected, which are transmitted from the transmission source subnetwork to the destination subnetwork will be described later.

Figure 2:
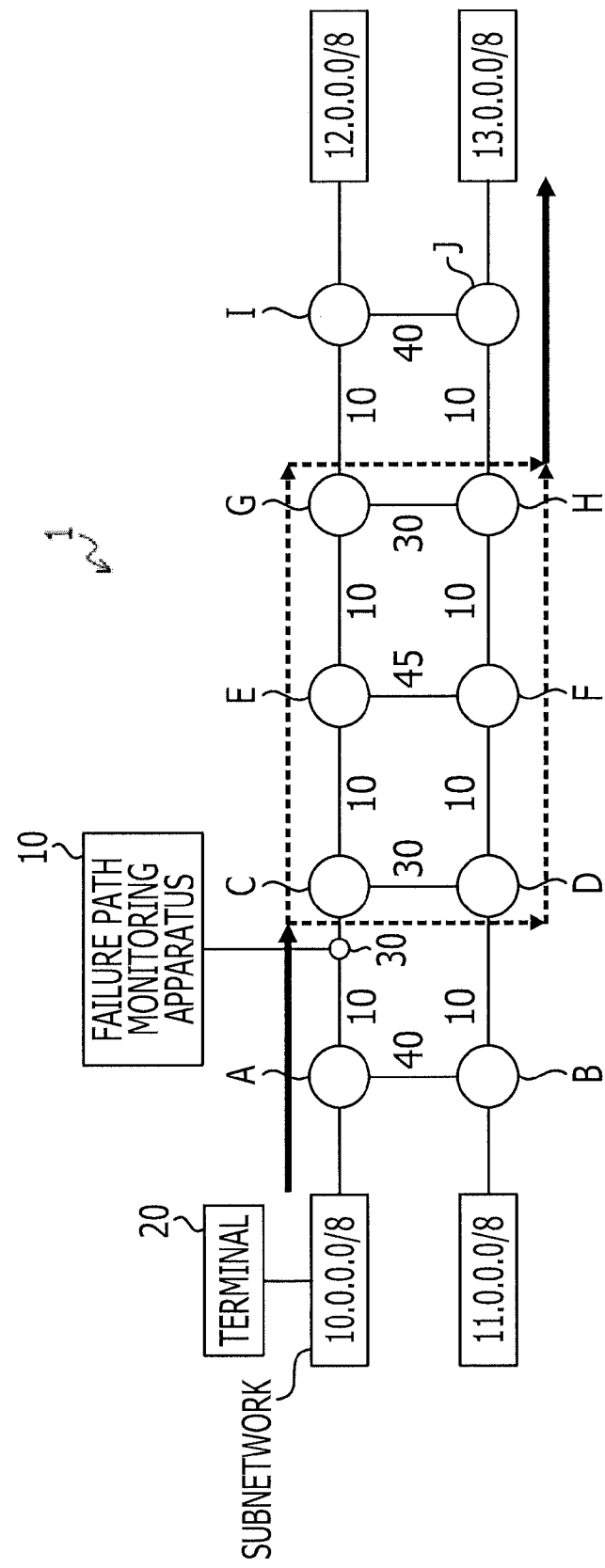
FIG. 2 illustrates an example of an IP network according to the first embodiment.

FIG. 2 illustrates an example of the configuration of an IP network 1 of the first embodiment.

As illustrated in FIG. 2, the IP network 1 includes relay devices, such as routers A to J. Then, it is possible to perform communication among a plurality of subnets (10.0.0.0/8, 11.0.0.0/8, 12.0.0.0/8, and 13.0.0.0/8) through these relay devices. Furthermore, the IP network 1 uses, for example, an OSPF protocol as a protocol for performing path control of communication among a plurality of subnets.

Here, in FIG. 2, the numerical values positioned among routers each indicate a cost between the routers. The OSPF protocol performs path control of communication among a plurality of subnets based on this cost. The cost may be used as a weighted value by which ease of selection as a transmission path may be controlled. By setting the cost to a small value, it is possible to make the transmission path easier to be selected as a transmission path.

For example, as illustrated in FIG. 2, in the flow from the transmission source subnetwork 10.0.0.0/8 to the destination subnetwork 13.0.0.0/8, both the paths of A→C→E→G→H→J and A→C→D→F→H→J are at a minimum cost. That is, it may be said that the flow from the transmission source subnetwork 10.0.0.0/8 to the destination subnetwork 13.0.0.0/8 is a flow of an ECMP having two different paths A→C→E→G→H→J and A→C→D→F→H→J. The section between the routers C to H indicated using a dotted line in FIG. 2 is called an ECMP section (section including a plurality of paths having an equal cost).

Furthermore, although not illustrated in the figure, also, the flow from the transmission source subnetwork 11.0.0.0/8 to the destination subnetwork 12.0.0.0/8 is an ECMP having two different paths B→D→C→E→G→I and B→D→F→H→G→I. The same also applies to a flow when the transmission source subnetwork and the destination subnetwork are reverse (communication in a reverse direction).

Furthermore, in each of the subnets 10.0.0.0/8, 11.0.0.0/8, 12.0.0.0/8, and 13.0.0.0/8, a plurality of terminals 20 exist, and packets are transmitted and received among the subnets in the IP network 1. In FIG. 2, one typical terminal 20 is connected to the subnetwork 10.0.0.0/8. However, another terminal 20 may exist. Furthermore, in FIG. 2, with regard to the other subnets 11.0.0.0/8, 12.0.0.0/8, and 13.0.0.0/8, similarly to the subnetwork 10.0.0.0/8, a plurality of terminals 20 may exist.

As described above, a plurality of terminals 20 are disposed in the subnets 10.0.0.0/8, 11.0.0.0/8, 12.0.0.0/8, and 13.0.0.0/8, and data may be transmitted to and received from another arbitrary terminal 20 of another subnetwork in the IP network 1. Furthermore, the terminal 20 also has functions of performing a path search, such as traceroute, on a specified destination IP address, and transmitting the path search execution result to the failure path monitoring apparatus 10 upon reception of a path search execution request (to be described later) from the failure path monitoring apparatus (apparatus for monitoring a path) 10.

For example, in the example of the configuration illustrated in FIG. 2, the failure path monitoring apparatus 10 is arranged with a branch unit 30 in between among the routers A to C. The failure path monitoring apparatus 10 is able to receive packets in the IP network 1 among the routers A to C, and information, such as path control information, and identify a failure path of the ECMP section based on these received items of information. As described above, the packet receiving unit 12 may receive path control information together with the packets in the IP network 1.

Here, the path control information is information for controlling a path, which is exchanged among relay devices, such as routers, in the network, and includes a destination network address, a network mask, information of an adjacent router, and the like.

The routers exchange and manage this path control information, and determine a router serving as a destination to which data is relayed, thereby controlling the path.

Examples of path control information include LSA used in an OSPF protocol, and path information used in a protocol, such as RIP (Routing Information Protocol).

A description will be given below by using as an example a case in which LSA is used as path control information.

LSA includes information on a network connected to each router and also the information on the above-mentioned cost. Each router determines a path in the IP network based on the exchanged information on LSA. For example, each router derives a path for which the cost of the path through which information transmitted from the transmission source subnetwork to the destination subnetwork is passed is minimized, and sets the derived path in the routing table, thereby determining the path in the IP network.

When a routing table is to be generated, when information to be transmitted from the transmission source subnetwork to the destination subnetwork is passed through an ECMP, each router sets, in the routing table, a plurality of paths constituting an ECMP as paths corresponding to the flow from the transmission source subnetwork to the destination subnetwork.

Furthermore, when information is transmitted from the transmission source subnetwork to the destination subnetwork, based on a certain rule for routing the path, each router determines a path through which information is passed from among a plurality of paths of ECMP.

Furthermore, when the identification unit 11 of the failure path monitoring apparatus 10 detects from the packet received by the packet receiving unit 12 that the deterioration of quality has occurred in the IP network 1, the identification unit 11 determines whether the flow (quality deterioration flow) in which the quality has deteriorated is a flow of an ECMP by referring to a routing table in the IP network 1, which is generated by the topology/path management unit 13 (to be described later) based on the LSA received by the packet receiving unit 12.

For example, when the identification unit 11 detects the deterioration of quality of the packet received by the packet receiving unit 12, the identification unit 11 refers to the transmission source IP address and the destination IP address from the header of the packet. Then, the identification unit 11 determines that the flow of the transmission source subnetwork and the destination subnetwork including the transmission source IP address and the destination IP address of the packet in which the deterioration of quality has been detected is a quality deterioration flow.

In the example illustrated in FIG. 2, when the identification unit 11 obtains, for example, the transmission source IP address 10.0.0.2 and the destination IP address 13.0.0.4 from the packet header of the packet in which the deterioration of quality has been detected, the identification unit 11 determines that the flow including the transmission source IP address and the destination IP address, that is, the flow from the transmission source subnetwork 10.0.0.0/8 to the destination subnetwork 13.0.0.0/8, is a quality deterioration flow.

Then, the identification unit 11 refers to a path corresponding to the transmission source subnetwork and the destination subnetwork of the quality deterioration flow from the routing table in the IP network 1, which is generated by the topology/path management unit 13 (to be described later). At this time, when a plurality of paths corresponding to the transmission source subnetwork and the destination subnetwork of the quality deterioration flow exist, the identification unit 11 determines that the quality deterioration flow is an ECMP.

For example, in the example illustrated in FIG. 2, paths corresponding to the flow from the transmission source subnetwork 10.0.0.0/8 to the destination subnetwork 13.0.0.0/8 are the following two different paths A→C→E→G→H→J and A→C→D→F→H→J (refer to the field of "path" corresponding to the "transmission source subnetwork "10.0.0.0/8" and the "destination subnetwork "13.0.0.0/8" of FIG. 5).

In the manner described above, each of the routers A to J sets, in the routing table, a plurality of paths in which information transmitted from the transmission source subnetwork to the destination subnetwork is at a minimum cost, that is, sets a plurality of paths constituting an ECMP when the information is passed through the ECMP as paths corresponding to the flow from the transmission source subnetwork to the destination subnetwork.

Here, the routing table generated and managed by the topology/path management unit 13 (to be described later) is generated based on the LSA exchanged among the routers A to J. Consequently, the routing table is the same as the routing table generated by the routers A to J.

Therefore, when the paths corresponding to the flow from the transmission source subnetwork 10.0.0.0/8 to the destination subnetwork 13.0.0.0/8 are two different paths, this means that this flow is an ECMP having two paths.

As a result of the foregoing, when a plurality of paths corresponding to the transmission source subnetwork and the destination subnetwork of the quality deterioration flow exist in the routing table, the identification unit 11 determines that the quality deterioration flow is an ECMP.

Then, when the quality deterioration flow is an ECMP, the identification unit 11 identifies a failure path in which the quality of the packet has deteriorated from among the plurality of paths of ECMP in accordance with a procedure to be described later.

In FIG. 2, the failure path monitoring apparatus 10 is arranged among the routers A to C in the IP network 1, and is not limited to this. The failure path monitoring apparatus 10 may be arranged at an arbitrary place in the IP network 1.

A plurality of failure path monitoring apparatuses 10 may be arranged at an arbitrary place in the IP network 1. The branch unit 30 causes all the IP packets including an LSA of OSPF, which are passed among routers in which the failure path monitoring apparatus 10 is arranged, to branch by using, for example, a network tap or a mirror port of an adjacent router so as to be supplied to the failure path monitoring apparatus 10.

Figure 3:
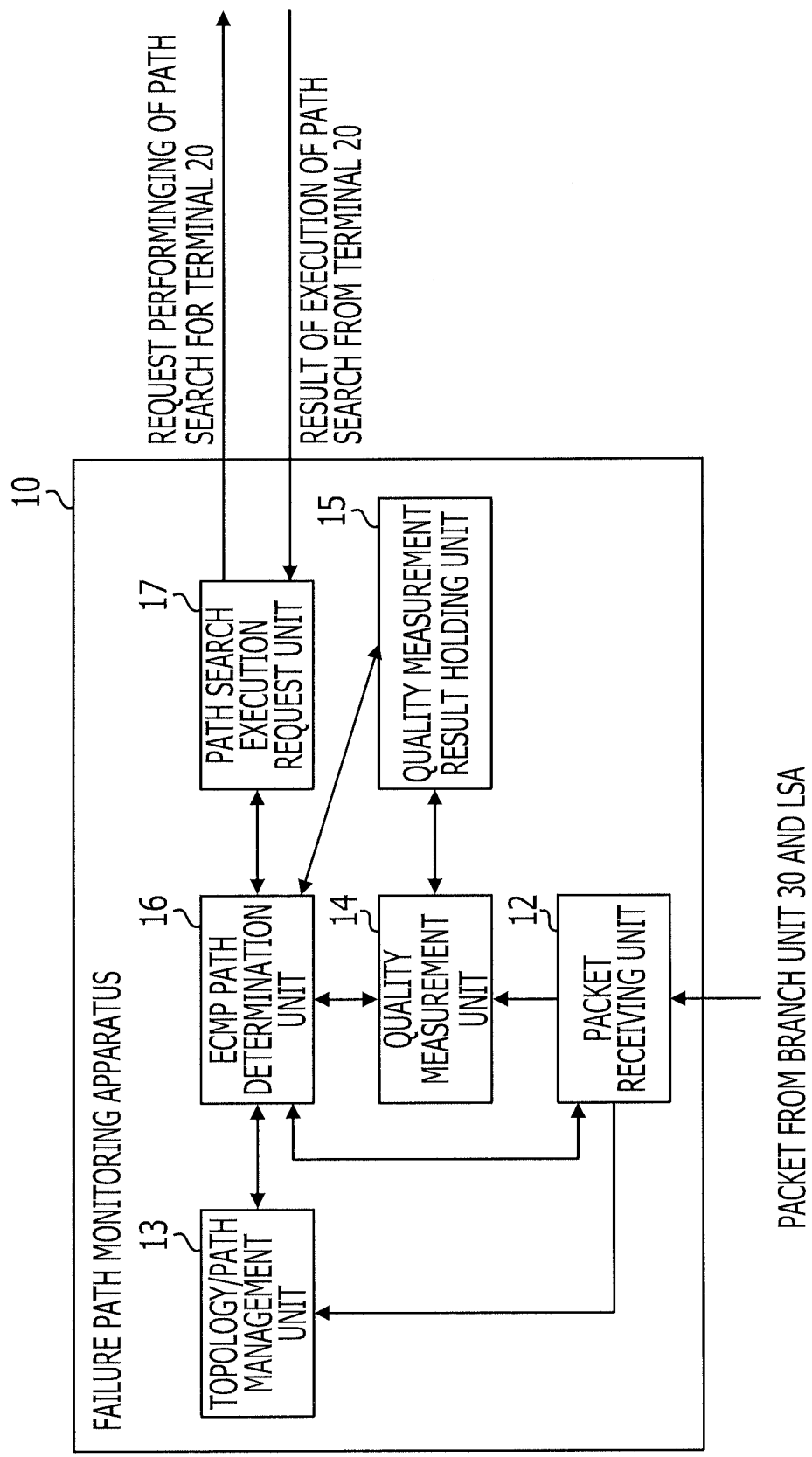
FIG. 3 illustrates an example of the failure path monitoring apparatus according to the first embodiment.

The failure path monitoring apparatus 10 may also be configured as illustrated in, for example, FIG. 3.

FIG. 3 is a block diagram illustrating an example of the configuration of the failure path monitoring apparatus 10 of the first embodiment.

Figure 4:
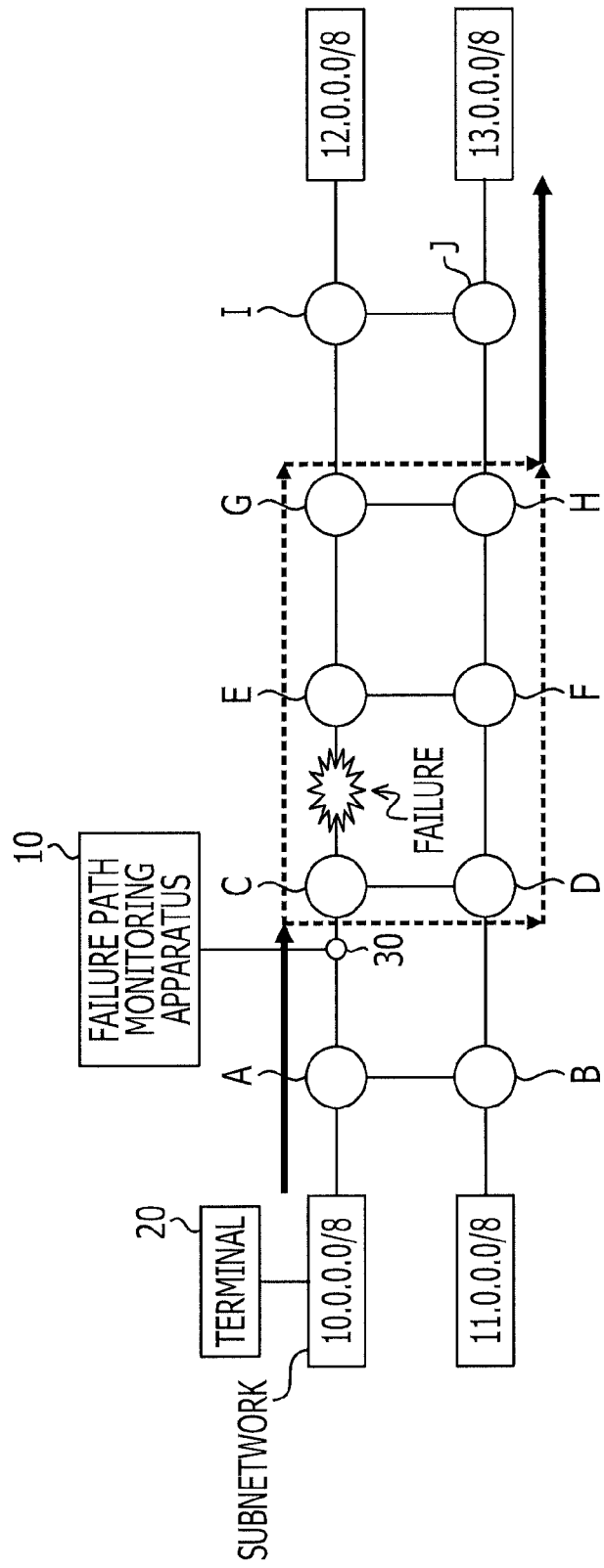
FIG. 4 illustrates a state in which a failure has occurred among routers of the IP network of the first embodiment.

FIG. 4 illustrates a state in which a failure has occurred among the routers C to E of the IP network 1 of the first embodiment.

As illustrated in FIG. 3, the failure path monitoring apparatus 10 includes the packet receiving unit 12 in the example of FIG. 1 above, and also includes a quality measurement unit 14, an ECMP path determination unit 16, and a path search execution request unit 17 as the identification unit 11 in the example of FIG. 1 above. Furthermore, the failure path monitoring apparatus 10 includes a topology/path management unit 13 and a quality measurement result holding unit 15.

In the following, as illustrated in FIG. 4, a description will be given by assuming that a failure has occurred among the routers C to E in the IP network 1, and the quality of packets that are passed among the routers C to E has deteriorated. In FIG. 4, the description of a cost among routers is omitted.

The packet receiving unit 12 receives all the packets that are passed through the place where the branch unit 30 has been arranged, which are made to branch by the branch unit 30, and the LSA of OSPF, outputs the received packets to the quality measurement unit 14 and the ECMP path determination unit 16, and outputs the LSA of OSPF to the topology/path management unit 13.

The topology/path management unit (management unit) 13 collects the LSA of OSPF received from the packet receiving unit 12, generates the topology of the IP network 1, and generates and manages a routing table T1 illustrated in FIG. 5, in which a passing router from the transmission source subnetwork to the destination subnetwork is set. Furthermore, similarly to the routers A to J, the topology/path management unit 13 derives a path for which the cost of the path through which information transmitted from the transmission source subnetwork to the destination subnetwork is passed is minimized, and sets the derived path in the routing table T1. Furthermore, when the information transmitted from the transmission source subnetwork to the destination subnetwork passes through an ECMP, the topology/path management unit 13 sets, in the routing table, a plurality of paths constituting an ECMP as paths corresponding to the flow from the transmission source subnetwork to the destination subnetwork.

In the routing table T1 illustrated in FIG. 5, the topology/path management unit 13 sets the path of the flow from the transmission source subnetwork to the destination subnetwork in units of the transmission source subnetwork and the destination subnetwork in the IP network 1.

Specifically, when FIG. 5 is referred to, the topology/path management unit 13 sets the path of the routers A CE G I based on the LSA in the flow from the transmission source subnetwork 10.0.0.0/8 to the destination subnetwork 12.0.0.0/8. Furthermore, the topology/path management unit 13 sets two paths of the routers A→C→E→G→H→J and the routers A→C→D→F→H→J based on the LSA in the flow from the transmission source subnetwork 10.0.0.0/8 to the destination subnetwork 13.0.0.0/8. Hereinafter, similarly, the topology/path management unit 13 sets the path of each flow based on the LSA in units of each of the transmission source subnetwork and the destination subnetwork.

When the transmission source subnetwork and the destination subnetwork are reverse, the topology/path management unit 13 may set, in the routing table T1 illustrated in FIG. 5, for example, the flow from the transmission source subnetwork 12.0.0.0/8 to the destination subnetwork 10.0.0.0/8.

Furthermore, the topology/path management unit 13 manages the connection between the routers, and the path information of each flow.

The quality measurement unit 14 classifies the packets received by the packet receiving unit 12 to a flow for each of the transmission source subnetwork and the destination subnetwork so as to measure the quality of each flow, and stores the measurement result in a quality measurement result holding unit (holding unit) 15 in the form of a quality measurement result table T2 (see FIG. 9) in units of the transmission source subnetwork and the destination subnetwork.

Figure 6:
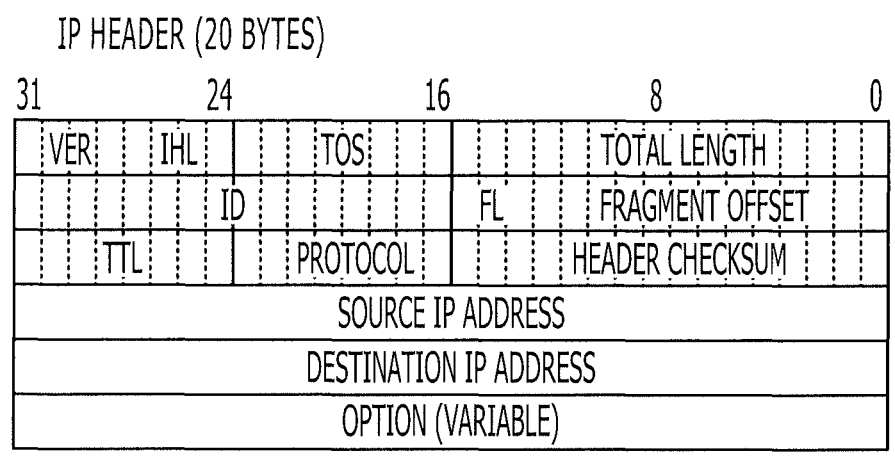
FIG. 6 illustrates an example of a header format of an IP header in the IP network of the first embodiment.
Figure 7:
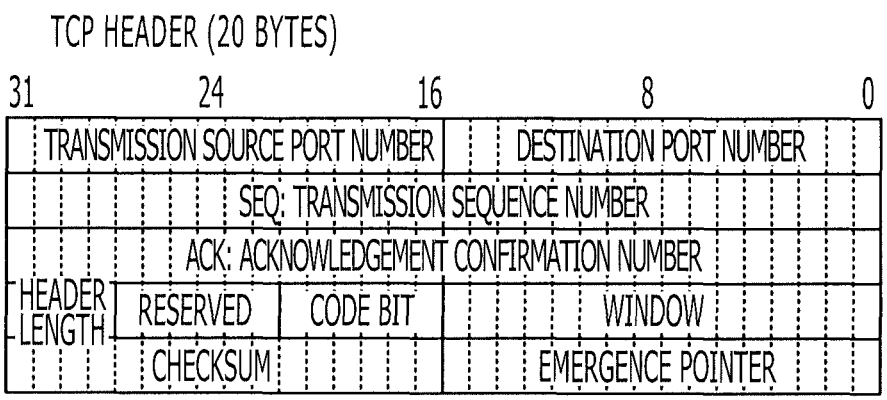
FIG. 7 illustrates an example of a header format of a TCP header in the IP network of the first embodiment.

FIGS. 6 to 8 illustrate the header formats of an IP packet, a TCP packet, a UDP packet, and an RTP packet.

Specifically, when measuring the deterioration of quality, if the packet received by the packet receiving unit 12 is an IP packet, the quality measurement unit 14 measures the loss of a packet by checking the loss of an ID (denoted as "ID" in FIG. 6) field.

In general, when an IP packet is to be transmitted, in the ID field of the IP header, a consecutive ID is set for each IP packet.

Therefore, the quality measurement unit 14 determines that a loss has occurred in the quality of the packet when the value of the ID field of the IP header of the IP packet received by the packet receiving unit 12 is not consecutive with the value of the ID field of the IP header of the IP packet received previously or within a range of a certain time period from the transmission source IP address that is the same as the received IP packet.

Here, the reason the IP packet to be compared with the IP header of the received IP packet is set to be an "IP packet received within a range of a certain time period" is that when the IP packet is transmitted in the IP network 1, it may occur that the IP packet is transmitted in a sequence differing from the sent sequence and is received by the packet receiving unit 12. The quality measurement unit 14 may measure the loss of the packet by various known techniques in addition to the above-mentioned technique.

When the fragment (division) of a packet is to be performed, the same ID is set in the ID field of the IP header of the packet to be divided. Therefore, the quality measurement unit 14 determines that the received packet is a divided packet when the value of the ID field of the IP header of the received IP packet is the same value as the value of the ID field of the IP header of the IP packet that is received previously or within a range of a certain time period from the transmission source IP address that is the same as that of the received IP packet.

In this case, the quality measurement unit 14 may measure the loss of the divided packet by checking as to whether there is a lost packet from the divided packets from the fragment flag (denoted as "FL" in FIG. 6) of the IP header of the received IP packet or from the fragment offset (denoted as "Fragment Offset" in FIG. 6).

Here, the fragment flag is information indicating whether a division process has been performed on an IP packet. The fragment offset is information indicating which byte counting from the beginning of the data portion of the IP packet before division the divided IP packet has been divided.

Furthermore, if the packet received by the packet receiving unit 12 is a TCP header, the quality measurement unit 14 measures the loss of a packet by checking the loss of a sequence number.

Furthermore, if the packet received by the packet receiving unit 12 is a UDP packet, the quality measurement unit 14 measures the loss of a packet by checking the loss of the sequence number of the RTP header of the RTP packet, which is a high-order protocol of the UDP packet.

Regarding the sequence number of the TCP header and the sequence number of the RTP header, in general, similarly to the above-mentioned ID of the IP header, a sequence number that is consecutive for each packet is set. Therefore, even when the packet received by the packet receiving unit 12 is a TCP packet or a UDP packet, similarly to the above-mentioned measurement of the loss of the IP packet, it is possible for the quality measurement unit 14 to measure the loss of a packet.

Then, the quality measurement unit 14 stores the quality measurement result in which measurement has been performed in the manner described above in a quality measurement result table T2 illustrated in FIG. 9, and causes the quality measurement result holding unit 15 to hold the quality measurement result.

Furthermore, with regard to the set of the transmission source subnetwork and the destination subnetwork in which a loss has occurred in the packet, the quality measurement unit 14 sets "1" (loss occurrence detected) in the field of the quality measurement result of the quality measurement result table T2. On the other hand, with regard to the set of the transmission source subnetwork and the destination subnetwork in which a loss has not occurred in the packet, the quality measurement unit 14 sets "0" (loss occurrence undetected) in the field of the quality measurement result thereof.

For example, in the quality measurement result table T2 illustrated in FIG. 9, both the number of lost packets on the transmission side and the number of lost packets on the reception side of the set of the transmission source subnetwork 10.0.0.0/8 and the destination subnetwork 12.0.0.0/8 are 100. Accordingly, the quality measurement unit 14 determines that a loss has occurred in the packet in the set of the transmission source subnetwork and the destination subnetwork, and sets "1" (loss occurrence detected) in the field of the quality measurement result. Similarly, also, in the set of the transmission source subnetwork 10.0.0.0/8 and the destination subnetwork 13.0.0.0/8 and in the set of the transmission source subnetwork 11.0.0.0/8 and the destination subnetwork 12.0.0.0/8, the quality measurement unit 14 determines that a loss has occurred in the set of the transmission source subnetwork and the destination subnetwork, and sets "1" (loss occurrence detected) in the field of the quality measurement result.

On the other hand, both the number of lost packets on the transmission side and the number of lost packets on the reception side of the set of the transmission source subnetwork 11.0.0.0/8 and the destination subnetwork 13.0.0.0/8 are 0. Accordingly, the quality measurement unit 14 determines that a loss has not occurred in the packet in the set of the transmission source subnetwork and the destination subnetwork, and sets "0" (loss occurrence undetected) in the field of the quality measurement result.

It is preferable that the quality measurement unit 14 make a determination as to whether or not a loss has occurred in the packet in the set of the transmission source subnetwork and the destination subnetwork based on a certain threshold value. For example, 50 has been set as a certain threshold value. The quality measurement unit 14 determines whether or not the number of lost packets on the transmission side and/or the number of lost packets on the reception side in the set of the transmission source subnetwork and the destination subnetwork is greater than or equal to a certain threshold value of 50. Then, when the number of lost packets is greater than or equal to 50, "1" (loss occurrence detected) is set in the field of the quality measurement result, and when the number of lost packets is less than 50, "0" (loss occurrence undetected) is set in the field of the quality measurement result.

Here, when the quality measurement unit 14 detects that a loss has occurred in the packet based on the quality measurement result stored in the quality measurement result table T2, the quality measurement unit 14 notifies the ECMP path determination unit 16 of the occurrence of the deterioration of quality. When a plurality of quality deterioration flows exist in the quality measurement result table T2 generated and updated by the quality measurement unit 14, the quality measurement unit 14 notifies the ECMP path determination unit 16 of the plurality of quality deterioration flows.

As described above, the quality measurement unit 14 has functions of performing quality measurement between the transmission source subnetwork and the destination subnetwork of the packet based on the information of the packet received by the packet receiving unit 12 and detecting the quality deterioration flow in which the deterioration of quality has occurred in units of the transmission source subnetwork and the destination subnetwork of the packet.

The quality measurement unit 14 performs quality measurement on packets received by the packet receiving unit 12, which are sequentially sent, in units of quality measurement (for example, in units of the transmission source subnetwork and the destination subnetwork in the manner described above). At this time, the quality measurement unit 14 stores the quality measurement result in the quality measurement result table T2 in sequence or every certain period. It is preferable that the quality measurement result stored in the quality measurement result table T2 be as up-to-date information as possible in order to ensure the accuracy of the quality measurement. Accordingly, the quality measurement unit 14 or the quality measurement result holding unit 15 may clear the quality measurement result stored in the quality measurement result table T2 at a certain period or under a condition in which a failure is reduced, or may move the quality measurement result to another storage medium. As a result, for example, when a loss of a packet has occurred due to a failure that occurred in the past, but has been reduced at present, it is possible to prevent the loss of the packet due to a failure that occurred in the past from being detected by the quality measurement unit 14 because the quality measurement result when the past failure occurred remains in the quality measurement result table T2.

When the ECMP path determination unit 16 is notified of the occurrence of quality deterioration from the quality measurement unit 14, the ECMP path determination unit 16 recognizes the set of the transmission source subnetwork and the destination subnetwork in which "1" (loss occurrence detected) has been set in the field of the quality measurement result as a quality deterioration flow based on the quality measurement result table T2 held by the quality measurement result holding unit 15.

In addition to the notification of the occurrence of the quality deterioration, the quality measurement unit 14 may notify the ECMP path determination unit 16 that the set of the transmission source subnetwork and the destination subnetwork in which "1" (loss occurrence detected) has been set in the field of the quality measurement result is a quality deterioration flow. As a result, it is possible for the ECMP path determination unit 16 to recognize the quality deterioration flow without referring to the quality measurement result table T2 of the quality measurement result holding unit 15.

The ECMP path determination unit 16 determines whether or not the quality deterioration flow is an ECMP in accordance with the notification of the quality deterioration from the quality measurement unit 14. With regard to the quality deterioration flow that has been determined to be an ECMP, the ECMP path determination unit 16 separates the quality deterioration flow between the transmission source subnetwork and the destination subnetwork to a plurality of flows, and causes the quality measurement unit 14 to perform a quality measurement once more for each separated flow. Furthermore, the ECMP path determination unit 16 selects the flow in which the deterioration of quality has occurred from the quality measurement result for each separated flow, causes the path search execution request unit 17 to perform a path search with regard to one arbitrary flow among the flows in which the deterioration of quality has occurred, and identifies the failure path of the quality deterioration flow based on the result of the path search.

Based on the path search request with regard to the one arbitrary flow from the ECMP path determination unit 16, the path search execution request unit 17 causes an arbitrary terminal 20 in the transmission source subnetwork to perform a path search, such as traceroute, and sends back the execution result to the ECMP path determination unit 16.

Specific operations of the ECMP path determination unit 16 and the path search execution request unit 17 will be described in detail below.

(A-2) Operation of ECMP Path Determination Unit 16 in First Embodiment (A-2-1) Determination as to Whether Quality Deterioration Flow is ECMP By referring to the routing table T1 held by the topology/path management unit 13, the ECMP path determination unit 16 determines whether or not the quality deterioration flow is an ECMP in accordance with the notification of the quality deterioration from the quality measurement unit 14, or determines the number of paths when the quality deterioration flow is an ECMP.

Here, whether or not the quality deterioration flow is an ECMP is determined whether or not the flow from the transmission source subnetwork to the destination subnetwork, which has been recognized as a quality deterioration flow, has a plurality of paths in the routing table T1 illustrated in FIG. 5.

For example, in the quality measurement result table T2 illustrated in FIG. 9, the flow in which "1" (loss occurrence detected) has been set in the field of the quality measurement result is considered. In the routing table T1 illustrated in FIG. 5, the flow from the transmission source subnetwork 10.0.0.0/8 to the destination subnetwork 12.0.0.0/8 has one kind of path of A→C→E→G→I. On the other hand, the flow from the transmission source subnetwork 10.0.0.0/8 to the destination subnetwork 13.0.0.0/8 is an ECMP having two different paths A→C→E→G→H→J and A→C→D→F→H→J. Furthermore, the flow from the transmission source subnetwork 11.0.0.0/8 to the destination subnetwork 12.0.0.0/8 is an ECMP having two kinds paths B→D→C→E→G→I and B→D→F→H→G→I.

At this time, when the ECMP path determination unit 16 is notified of a plurality of quality deterioration flows, the ECMP path determination unit 16 selects an arbitrary quality deterioration flow, and sequentially determines whether or not the selected quality deterioration flow is an ECMP.

Therefore, when the ECMP path determination unit 16 selects a quality deterioration flow from the transmission source subnetwork 10.0.0.0/8 to the destination subnetwork 12.0.0.0/8, the ECMP path determination unit 16 determines that the quality deterioration flow is not an ECMP. Furthermore, when the ECMP path determination unit 16 selects the quality deterioration flow from the transmission source subnetwork 10.0.0.0/8 to the destination subnetwork 13.0.0.0/8, the ECMP path determination unit 16 determines that the quality deterioration flow is an ECMP and the number of paths is 2. In addition, when the quality deterioration flow from the transmission source subnetwork 11.0.0.0/8 to the destination subnetwork 12.0.0.0/8 is selected, it is determined that the quality deterioration flow is an ECMP, and the number of paths is 2.

As described above, the ECMP path determination unit 16 determines whether or not the quality deterioration flow notified from the quality measurement unit 14 is an ECMP by referring to the routing table T1. Furthermore, when it is determined that the quality deterioration flow is an ECMP, the number of paths thereof is calculated based on the routing table T1.

In the manner described above, similarly to the routers A to J, the topology/path management unit 13 selects a path for which the cost of the path through which the information transmitted from the transmission source subnetwork to the destination subnetwork is passed is minimized, and generates the routing table T1. As described above, under the control in which a minimum cost is selected, when the ECMP path determination unit 16 determines that one flow has a plurality of paths, this means that the flow is an ECMP.

Furthermore, when the ECMP path determination unit 16 determines that the quality deterioration flow is not an ECMP, the ECMP path determination unit 16 confirms as to whether or not there is another quality deterioration flow notified from the quality measurement unit 14. When there is another quality deterioration flow, the ECMP path determination unit 16 determines whether or not the other the quality deterioration flow is an ECMP. On the other hand, when there is no other quality deterioration flow, it is possible for the ECMP path determination unit 16 to identify the failure path of the quality deterioration flow by a known technique. Consequently, the failure path identification process of the ECMP section is completed.

(A-2-2) Modulo (n) Calculation

Next, the ECMP path determination unit 16 separates the quality deterioration flow between the transmission source subnetwork and the destination subnetwork to a plurality of flows by a modulo (n) calculation with regard to the quality deterioration flow that has been determined to be an ECMP. N denotes the number of paths of the ECMP of the quality deterioration flow.

Here, the modulo (n) calculation is a technique in which an actual router uses when the path of the ECMP is routed with regard to data that is passed through the ECMP in the IP network using a routing protocol, such as OSPF. When a packet is to be sent out (relayed) to an ECMP, the router determines which one of the paths (routers) the packet may be sent out (relayed) to. At this time, the router determines which one of the paths (routers) the packet may be sent out (relayed) to based on a path routing rule using a modulo (n) calculation.

Figure 10:
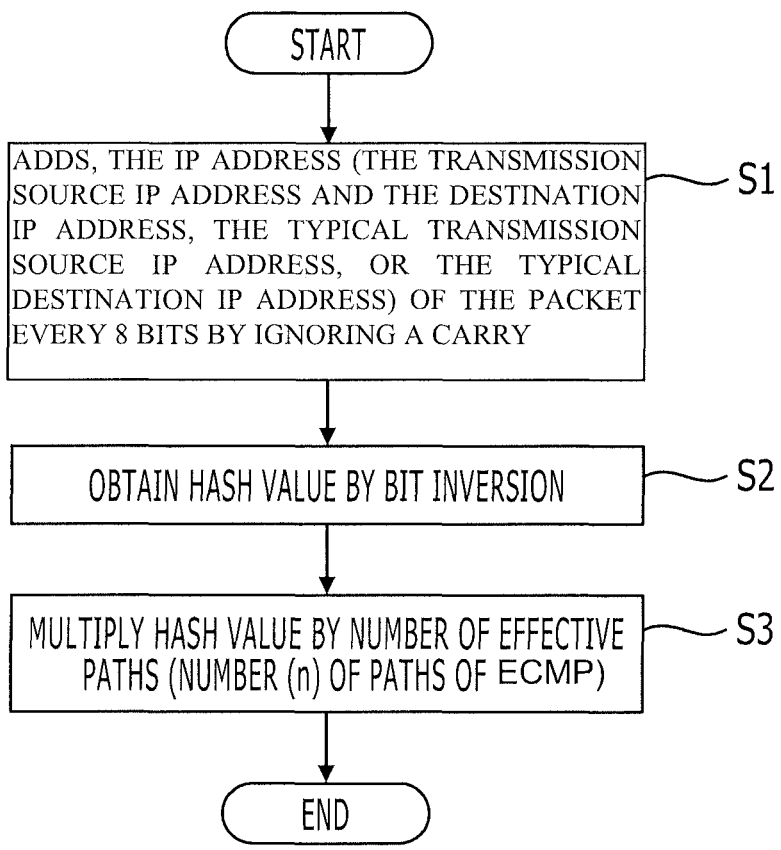
FIG. 10 illustrates an example of a procedure of a modulo (n) calculation that is performed by an ECMP path determination unit of a router or the failure path monitoring apparatus in the IP network of the first embodiment.

FIG. 10 is a flowchart illustrating the procedure of a modulo (n) calculation performed by the routers A to J of the IP network 1 or by the ECMP path determination unit 16 in the failure path monitoring apparatus 10 in the first embodiment.

Specifically, as illustrated in FIG. 10, the router adds the IP address (the transmission source IP address and the destination IP address, the typical transmission source IP address, or the typical destination IP address) of the packet (S1) every 8 bits by ignoring a carry. Next, the router performs bit inversion of the data of 8 bits of the addition result so as to obtain a hash value (S2). Finally, the router divides the value obtained by multiplying the hash value by the number of effective paths (the number (n) of paths of ECMP) by 256, and discards all digits to the right of the decimal point, thereby obtaining selection paths 0 to n−1 for each packet to be sent out (relayed) to an ECMP (S3).

Hereinafter, the flow from the transmission source IP address 10.0.0.1 to the destination IP address 13.0.0.2 in the flow from the transmission source subnetwork 10.0.0.0/8 to the destination subnetwork 13.0.0.0/8 will be illustrated.

The router adds the transmission source IP address and the destination IP address every 8 bits by ignoring a carry, and obtains a hexadecimal number of (1) below (S1).

$$10+0+0+1+13+0+0+2=26_{10}=H'[2^{7-0}]=0x1A \qquad (1)$$

Next, the router performs bit inversion of the hexadecimal number of (1) by a binary number, and obtains a hash value of a decimal number of (2) below (S2).

$$H'[2^{7-0}]=0x1A=0001\ 1010_2 \rightarrow \text{(bit inversion)} \rightarrow 0101\ 1000_2 = H\,[2^{7-0}] = H'[2^{0-7}] = 0x58 = 88_{10} \quad (2)$$

Finally, the router divides the value obtained by multiplying the hash value 88 by the number of effective paths of 2 by 256, and discards all digits to the right of the decimal point, thereby obtaining "0" as a selection path (S3).

Similarly, examples of the flow from the transmission source IP address 10.0.0.4 to the destination IP address 13.0.0.6 in the flow from the transmission source subnetwork 10.0.0.0/8 to the destination subnetwork 13.0.0.0/8 will be described as examples.

The router adds the transmission source IP address and the destination IP address every 8 bits by ignoring a carry, and obtains a hexadecimal number of (3) below (S1).

$$10+0+0+4+13+0+0+6=33_{10}=H\,'[2^{7-0}]=0x21 \quad (3)$$

Next, the router performs bit inversion of the hexadecimal number of (3) by a binary number, and obtains a hash value of a decimal number of (4) below (S2).

$$H\,'[2^{7-0}]=0x21=0010\ 0001_2 \rightarrow \text{(bit inversion)} \rightarrow 1000\ 0100_2=H\,[2^{7-0}]=H\,'[2^{0-7}]=0x84=132_{10} \quad (4)$$

Finally, the router divides the value obtained by multiplying the hash value 132 by the number of effective paths 2 by 256, and discards all digits to the right of the decimal point, thereby obtaining "1" as a selection path (S3).

The router sends out (relays) each packet to one of the paths (routers) of the ECMP corresponding to n different selection paths routed by the modulo (n) calculation in this manner.

In the modulo (n) calculation result, when the number (n) of paths of the ECMP is 2, in terms of the properties of the modulo (n) calculation, the value of the selection path of 0 or 1 is assigned depending on whether the sum of the least significant addresses of the transmission source IP address and the destination IP address is an even number or an odd number. In the example illustrated in FIG. 10, the sum of the least significant address "1" of the transmission destination IP address 10.0.0.1 and the least significant address "2" of the destination IP address 13.0.0.2 is "3 (odd number)". The sum of the least significant address "4" of the transmission destination IP address 10.0.0.4 and the least significant address "6" of the destination IP address 13.0.0.6 is "10 (even number)".

Therefore, in the above-described example, when the number (n) of paths of the ECMP is 2, it may be said that the selection path is routed in such a manner that if the sum of the least significant address of the transmission destination IP address and the least significant address of the destination IP address is an odd number, the selection path becomes the selection path "0", and if the sum of the least significant address of the transmission destination IP address and the least significant address of the destination IP address is an even number, the selection path becomes the selection path "1".

In the example illustrated in FIG. 10, the IP address used for the modulo (n) calculation is set as the transmission source IP address and the destination IP address. Depending on the routing rule used by the router, there is a case in which the router performs a modulo (n) calculation using the typical destination IP address or using the typical transmission source IP address. In this case, the router applies each illustrated in FIG. 10 above with regard to the transmission source IP address or the destination IP address.

As described above, by using the routing rule based on the above-mentioned modulo (n) calculation used when the router arranged in the IP network 1 routes the path of an ECMP, the ECMP path determination unit 16 separates the quality deterioration flow that has been determined to be an ECMP to a plurality of flows.

In other words, it is possible for the ECMP path determination unit 16 to determine which one of the selection paths is routed from among N selection paths for each flow of the transmission source IP address and the destination IP address of the quality deterioration flow by reproducing (using the rule in a similar manner) a technique in which the actual router routes the path of the ECMP).

As described above, it is possible for the ECMP path determination unit 16 serving as the identification unit 11 to estimate a plurality of packets that are routed through different paths from a plurality of packets transmitted from the transmission source subnetwork to the destination subnetwork, in which the deterioration of quality has been detected in the received packet by using the determination criterion with which the same routing result as that of the path routing rule for packets is obtained by the relay device.

At this time, it is possible for the ECMP path determination unit 16 serving as the identification unit 11 to estimate a plurality of packets based on the result of the modulo (n) calculation in which one of the transmission source address and the destination address, the transmission source address, and the destination address of the received packet in which the deterioration of quality has been detected is used.

Furthermore, based on the routing table T1 generated by the topology/path management unit 13, the ECMP path determination unit 16 serving as the identification unit 11 determines whether or not a plurality of transmission paths between the transmission source subnetwork and the destination subnetwork of the received packet, in which the deterioration of quality has been detected, exist, and also calculates the number of paths of the transmission path. Then, when the ECMP path determination unit 16 serving as the identification unit 11 determines that a plurality of transmission paths exist, the ECMP path determination unit 16 may estimate a plurality of packets that are routed through different paths from among the transmission paths of the calculated number of paths between the transmission source subnetwork and the destination subnetwork.

(A-2-3) Identification of Failure Path of Quality Deterioration Flow

Next, a description will be given, with reference to FIGS. 11 to 13, of a method of identifying a failure path of a quality deterioration flow of the ECMP path determination unit 16.

Figure 11:
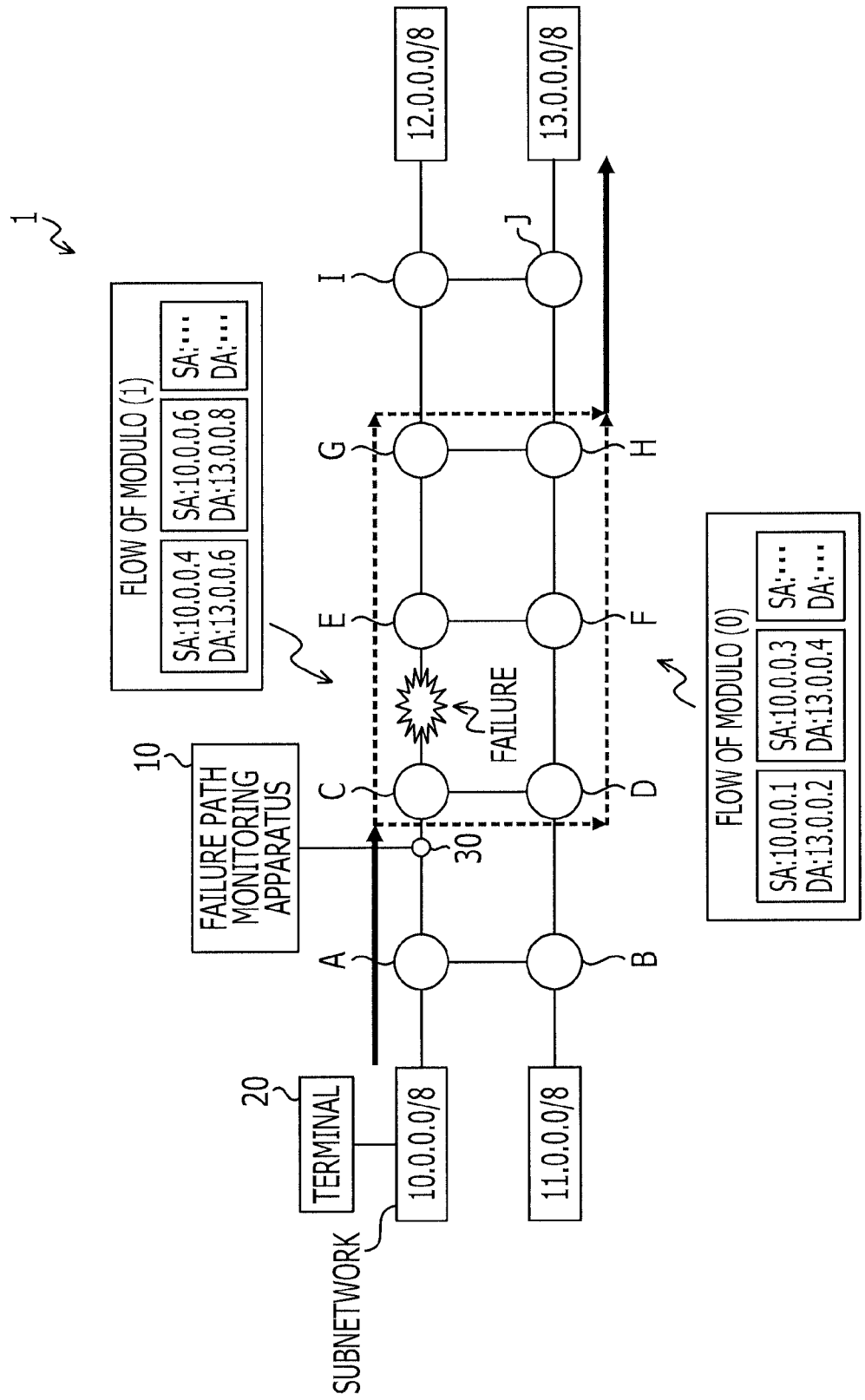
FIG. 11 illustrates an example of a path of a flow, which is routed by a router in the IP network of the first embodiment when a failure has occurred among routers.

FIG. 11 illustrates a path of a flow that is routed by the router in the IP network 1 of the first embodiment when a failure occurs among the routers C to E.

FIGS. 12 and 13 illustrate a search path candidate table T3 generated by the ECMP path determination unit 16 and a quality measurement result table T4 for each modulo, respectively.

Hereinafter, as illustrated in FIG. 11, it is assumed that in the IP network 1 using a routing protocol, such as OSPF, the path of A→C→E→G→H→J has been routed by the router to the flow of a selection path 1 (in the figure and in the following, also referred to as a modulo (1)). Similarly, it is assumed that the path of A→C→D→F→H→J has been routed by the router to the flow of a selection path 0 (in the figure and in the following, also referred to as a modulo (0)).

Here, as a result of the modulo (n) calculation by the router, the selection path 1 has been assigned to the flow of the transmission source IP address (in the figure, denoted as SA):

10.0.0.4, and the destination IP address (in the figure, denoted as DA): 13.0.0.6, the flow of the transmission source IP address: 10.0.0.6 and the destination IP address: 13.0.0.8, and the like.

Similarly, as a result of the modulo (n) calculation by the router, the selection path 0 has been assigned to the flow of the transmission source IP address: 10.0.0.1 and the destination IP address: 13.0.0.2, the flow of the transmission source IP address: 10.0.0.3 and the destination IP address: 13.0.0.4, and the like.

As described above, each flow of the transmission source IP address and the destination IP address in the ECMP has been routed to one of the paths by the routing by the router.

In the manner described above, it is possible for the ECMP path determination unit 16 to know what kind of path exists in the flow from the transmission source subnetwork to the destination subnetwork based on the routing table T1. however, it is not possible for the ECMP path determination unit 16 to know which path the flow for each of the transmission source IP address and destination IP address has been routed by the router. Also, in the quality measurement result table T2 held by the quality measurement result holding unit 15, similarly, it is not possible for the ECMP path determination unit 16 to know which path the flow for each of the transmission source IP address and destination IP address has been routed by the router.

The ECMP path determination unit 16 performs the above-mentioned modulo (n) calculation on the quality deterioration flow that has been determined to be an ECMP so as to separate the quality deterioration flow to the number (n) of paths of ECMP.

Furthermore, the ECMP path determination unit 16 causes the quality measurement unit 14 to perform a quality measurement on each of the quality deterioration flows that have been separated into N quality deterioration flows (hereinafter, the separated quality deterioration flow will be referred to as a quality deterioration candidate flow), and narrows down the flows in which the deterioration of quality has occurred from among the plurality of quality deterioration candidate flows.

Hereinafter, with regard to the quality deterioration flow from the transmission source subnetwork 10.0.0.0/8 to the destination subnetwork 13.0.0.0/8, the operation of the ECMP path determination unit 16 when the quality deterioration flow is an ECMP will be described in detail.

First, the ECMP path determination unit 16 generates a search path candidate table T3 illustrated in FIG. 12, and sets the transmission source subnetwork and the destination subnetwork of the target quality deterioration flow in the fields of the transmission source subnetwork and the destination subnetwork, respectively. Furthermore, the ECMP path determination unit 16 sets the selection paths of 0 to n−1 in the fields of the modulo (n) based on the number (n) of paths of ECMP, which are obtained from the routing table T1 held by the topology/path management unit 13. In the example illustrated in FIG. 12, the ECMP path determination unit 16 sets 10.0.0.0/8 in the field of the transmission source subnetwork, sets 13.0.0.0/8 in the field of the destination subnetwork, and sets 0 and 1 in the field of modulo (n).

Similarly, the ECMP path determination unit 16 generates a quality measurement result table T4 for each modulo, which is illustrated in FIG. 13, and sets the transmission source subnetwork and the destination subnetwork of the target quality deterioration flow in the fields of the transmission source subnetwork and the destination subnetwork, respectively. Furthermore, based on the number (n) of paths of ECMP, the ECMP path determination unit 16 sets the selection paths of 0 to n−1 in the fields of the modulo (n). In the example illustrated in FIG. 13, the ECMP path determination unit 16 sets 10.0.0.0/8 in the field of the transmission source subnetwork, sets 13.0.0.0/8 in the field of the destination subnetwork, and sets 0 and 1 in the field of the modulo (n).

Next, the ECMP path determination unit 16 extracts, from among the plurality of packets received by the packet receiving unit 12, the packets in which the transmission source IP address and the destination IP address of the packet are included in the transmission source subnetwork and the destination subnetwork of the quality deterioration flow. Then, the ECMP path determination unit 16 performs a modulo (n) calculation using the transmission source IP address and the destination IP address of each of the extracted packets, and separates the quality deterioration flow to a plurality of quality deterioration candidate flows.

At this time, the ECMP path determination unit 16 sets the transmission source IP address and the destination IP address of the extracted packet in the field of the transmission source IP address/destination IP address corresponding to the obtained selection paths 0 to n−1 of the search path candidate table T3.

The processing from the extraction of the packet to the modulo (n) calculation, which is performed by the ECMP path determination unit 16, is repeatedly performed by sequentially changing the packets until all the values of the selection paths 0 to n−1 of the fields of the modulo (n) stored in the search path candidate table T3 appear. When the selection path obtained by the modulo (n) calculation is the same as the selection path obtained previously, the ECMP path determination unit 16 may omit the setting of the transmission source IP address and the destination IP address of the packet in the search path candidate table T3.

As described above, the ECMP path determination unit 16 separates the quality deterioration flow to N quality deterioration candidate flows of modulos (0) to (n−1).

Next, the ECMP path determination unit 16 requests the quality measurement unit 14 to sequentially perform quality measurement on each of the quality deterioration candidate flows of modulos (0) to (n−1) based on the value of the selection paths 0 to n−1 of the field of the modulo (n) stored in the search path candidate table T3.

The quality measurement unit 14 receiving this request causes the ECMP path determination unit 16 to perform a modulo (n) calculation with regard to the transmission source IP address and the destination IP address of the packet that is sent from the packet receiving unit 12, and confirms whether or not the flow of the IP address is a modulo (0) for which quality measurement is performed based on the calculation result. The quality measurement unit 14, as described above, causes the ECMP path determination unit 16 to perform a modulo (n) calculation with regard to the transmission source IP address and the destination IP address of the packet that is sent from the packet receiving unit 12 until the packet corresponding to the quality deterioration candidate flow of the modulo (0) of the quality measurement target is received.

As a result of the modulo (n) calculation, when the quality measurement unit 14 confirms that the flow of the transmission source IP address and the destination IP address of the packet that is sent from the packet receiving unit 12 is a quality deterioration candidate flow of modulo (0), the quality measurement unit 14 performs quality measurement on the flow of the transmission source IP address and the destination IP address.

Similarly, the quality measurement unit 14 causes the ECMP path determination unit 16 to perform a modulo (n) calculation with regard to the transmission source IP address and the destination IP address of the packet that is sent from the packet receiving unit 12. When the quality measurement unit 14 confirms that the flow is a quality deterioration candidate flow of modulo (1), the quality measurement unit 14 performs quality measurement on the flow of the transmission source IP address and the destination IP address.

As described above, the quality measurement unit 14 changes the quality measurement target from the modulos (0) to (n−1), and sequentially performs quality measurement on the quality deterioration candidate flows of the modulos (0) to (n−1).

That is, the quality measurement unit 14 has functions of causing the ECMP path determination unit 16 to perform a modulo (n) calculation on each of a plurality of packets received by the packet receiving unit 12, and performing, when the result of the modulo calculation corresponds to the quality deterioration candidate flow for which quality measurement is performed, quality measurement with regard to the transmission source IP address and the destination IP address of the packet that has been used for the modulo calculation.

In order to ensure the accuracy of the quality measurement, it is preferable that the quality measurement unit 14 perform quality measurement on packets of a fixed number or more in units of quality measurement. Accordingly, the quality measurement unit 14 may sequentially perform quality measurement on packets of the flow for which quality measurement is performed, which are sent from the packet receiving unit 12, until a certain time passes from when the quality measurement is started. Alternatively, the quality measurement unit 14 may sequentially perform quality measurement until at least one of the number of transmitted packets, the number of received packets, the number of lost packets on the transmission side, and the number of lost packets on the reception side reaches a certain numerical value that is set for each quality measurement unit.

Then, when the ECMP path determination unit 16 receives the quality measurement result of each quality deterioration candidate flow of the modulos (0) to (n−1) from the quality measurement unit 14, the ECMP path determination unit 16 sets the quality measurement result in the field, which correspond to the modulo (0) to (n−1) of the quality measurement result table T4 for each modulo. In the example illustrated in FIG. 13, the ECMP path determination unit 16 sets the number of transmitted packets, the number of received packets, the number of lost packets on the transmission side, and the number of lost packets on the reception side in the corresponding fields.

Furthermore, at the same time, the ECMP path determination unit 16 determines whether or not the deterioration of quality of the packet has occurred based on the quality measurement result of the quality measurement result table T4 for each modulo. When it is determined that the quality deterioration has occurred, "1" (loss occurrence detected) is set in the field of the quality measurement result of the quality deterioration candidate flow of the search path candidate table T3. On the other hand, when it is determined that the quality deterioration has not occurred, "0" (loss occurrence undetected) is set in the field of the quality measurement result of the quality deterioration candidate flow of the search path candidate table T3.

As described above, the ECMP path determination unit 16 causes the quality measurement unit 14 to sequentially perform quality measurement with regard to the respective quality deterioration candidate flows corresponding to the selection paths 0 to n−1 of the field of the modulo (n) stored in the search path candidate table T3. As a result, the quality measurement result for each quality deterioration candidate flow is stored in all the fields excluding the field of the quality deterioration path of the search path candidate table T3, and in all the fields of the quality measurement result table T4 for each modulo.

That is, the ECMP path determination unit 16 serving as the identification unit 11 extracts a plurality of packets in which the transmission source address and destination address of the packet are included in the transmission source subnetwork and the destination subnetwork of the received packet in which the deterioration of quality has been detected from among the received packets received by the packet receiving unit 12. Then, the ECMP path determination unit 16 serving as the identification unit 11 estimates a plurality of packets based on the result of the modulo (n) calculation using one of the transmission source and destination addresses, the transmission source address, and the destination address of each of the extracted packets.

Next, the ECMP path determination unit 16 searches for a modulo (n) in which the quality measurement result is "1" (loss occurrence detected) by referring to the search path candidate table T3. Then, when the ECMP path determination unit 16 confirms that one of the quality measurement results of the selection paths 0 to n−1 of the modulo (n) is "1" (loss occurrence detected), the ECMP path determination unit 16 determines that a failure has occurred in the quality deterioration candidate flow corresponding to the selection path.

That is, in the examples illustrated in FIGS. 11 to 13, the ECMP path determination unit 16 determines that a failure has occurred in the quality deterioration candidate flow of the modulo (1).

Here, there are cases in which, in the search path candidate table T3, the selection paths 0 to n−1 in which the quality measurement result is "1" (loss occurrence detected) do not exist or two or more selection paths 0 to n−1 in which the quality measurement result is "1" (loss occurrence detected) exist.

The reason for this is that, as described above, depending on the routing rule used by the router, there is a case in which the transmission source IP address and the destination IP address are not used, and a modulo (n) calculation using the typical transmission source IP address or the typical destination IP address is performed.

Therefore, in this case, the ECMP path determination unit 16 determines that the modulo (n) calculation when the quality deterioration flow is to be separated differs from the routing rule by which routing is actually performed by the router.

Then, the EMCP path determination unit 16 changes the IP address used when the modulo (n) calculation is performed to the transmission source IP address or the destination IP address, and performs once more starting from the procedure for separating the quality deterioration flow.

That is, when the ECMP path determination unit 16 does not detect the quality deterioration candidate flow in which the deterioration of quality has occurred or has detected two or more quality deterioration candidate flows in which the deterioration of quality has occurred, the ECMP path determination unit 16 separates the quality deterioration flow based on another modulo (n) calculation result that is not used for the separation among the transmission source IP address and the destination IP address, the transmission source IP address, and the destination IP address in the transmission source subnetwork and the destination subnetwork of the quality deterioration flow. Then, the ECMP path determination unit 16 causes the quality measurement unit 14 to perform a quality measurement for each of the separated quality deterioration candidate flows.

In other words, the quality measurement unit 14 and the ECMP path determination unit 16 serving as the identification unit 11 perform quality measurement on a plurality of estimated packets. When the quality measurement unit 14 and the ECMP path determination unit 16 cannot identify the packet that is routed through the failure path or cannot determine that the packet that is routed through two or more different paths is a packet that is routed through the failure path, the quality measurement unit 14 and the ECMP path determination unit 16 estimate a plurality of packets based on the result of another modulo calculation, which is not used to estimate the plurality of packets among the transmission source and destination addresses, the transmission source address, or the destination address in the transmission source subnetwork and the destination subnetwork of the received packet in which the deterioration of quality has been detected. Then, the quality measurement unit 14 and the ECMP path determination unit 16 serving as the identification unit 11 identify which packet is a packet that is routed through the failure path by performing quality measurement on the plurality of packets.

At this time, the ECMP path determination unit 16 may store, in storage means, such as a memory (not illustrated), information indicating which pattern is used from among the transmission source IP address and the destination IP address, the transmission source IP address, and the destination IP address when a modulo (n) calculation is performed. As a result, it is possible for the ECMP path determination unit 16 to change the IP address used for performing a modulo (n) calculation based on the information stored in the storage means.

There is a case in which even if a modulo (n) calculation is performed by using all the patterns of the transmission source IP address and the destination IP address, the transmission source IP address, and the destination IP address, the quality measurement result of one of the selection paths 0 to n−1 of the modulo (n) does not become "1" (loss occurrence detected).

At this time, the ECMP path determination unit 16 determines that the deterioration of quality of the quality deterioration flow has occurred outside the ECMP section (in the example illustrated in FIG. 11, among the routers A to C or H to J), and the processing is completed.

Up to this point, the description has been given first of the case in which the transmission source IP address and the destination IP address are used in the modulo (n) calculation by the ECMP path determination unit 16, and the modulo (n) calculation is not limited to this. Alternatively, the typical transmission source IP address or the typical destination IP address may be used first.

As described above, the ECMP path determination unit 16 extracts a plurality of packets in which the transmission source IP address and the destination IP address of the packet are included in the transmission source subnetwork and the destination subnetwork of the quality deterioration flow from among the plurality of packets received by the packet receiving unit 12. Then, the ECMP path determination unit 16 has a function of separating the quality deterioration flow to a plurality of quality deterioration candidate flows based on the modulo (n) calculation result using one of the transmission source IP address and the destination IP address, the transmission source IP address and the destination IP address of each of the extracted packets.

In other words, the quality measurement unit 14 and the ECMP path determination unit 16 serving as the identification unit 11 perform a modulo (n) calculation on each of the received packets received by the packet receiving unit 12. When the result of the modulo calculation corresponds to the result of the modulo (n) calculation of the received packet in which the deterioration of quality has been detected, the quality measurement unit 14 and the ECMP path determination unit 16 perform quality measurement based on the information of the packet, which is the transmission source and destination addresses of the packet used for the modulo (n) calculation.

Next, when the ECMP path determination unit 16 determines based on the above-mentioned procedures that a failure has occurred in the quality deterioration candidate flow corresponding to one of the selection paths as a result of the quality measurement of all the quality deterioration candidate flows, the ECMP path determination unit 16 requests the path search execution request unit 17 to perform a path search for one arbitrary flow from among the quality deterioration candidate flows corresponding to the selection path.

Here, the one arbitrary flow is a flow from the actual transmission source IP address that is included in the quality deterioration candidate flow corresponding to the selection path to the destination IP address.

In the example illustrated in FIG. 11, the one arbitrary flow is one flow among the flows of the transmission source IP address 10.0.0.4 to the destination IP address 13.0.0.6, the flow of the transmission source IP address 10.0.0.6 to the destination IP address 13.0.0.8, and the like, which are included in the quality deterioration candidate flows of the modulo (1).

Accordingly, by referring to the search path candidate table T3 illustrated in FIG. 12, the ECMP path determination unit 16 reads the transmission source IP address and the destination IP address that are set when the quality deterioration flow is separated, which corresponds to the selection path, and transmits them together with a path search execution request to the path search execution request unit 17.

Based on the transmission source IP address and the destination IP address as one arbitrary flow received from the ECMP path determination unit 16, the path search execution request unit 17 causes the terminal 20 having the transmission source IP address in the transmission source subnetwork to perform a path search, such as traceroute, for the destination IP address.

The terminal 20 having the transmission source IP address performs a path search for the destination IP address. The path search execution result is transmitted from the terminal 20 to the path search execution request unit 17 and is further transmitted from the path search execution request unit 17 to the ECMP path determination unit 16.

When the ECMP path determination unit 16 receives the path search execution result for the one arbitrary flow, the ECMP path determination unit 16 sets the path information as the path search execution result in the field of the quality deterioration path corresponding to the selection path of the search path candidate table T3.

In the example illustrated in FIG. 12, the failure path of A→C→E→G→H→J is set in the field of the quality deterioration path corresponding to the modulo (1).

With the above-mentioned procedures, the ECMP path determination unit 16 and the path search execution request unit 17 obtain the path of the quality deterioration candidate flow in which the deterioration of quality has occurred so as to identify the failure path of the quality deterioration flow.

As described above, the ECMP path determination unit 16 and the path search execution request unit 17 function in cooperation as path identification units for identifying the failure path of the ECMP section.

Therefore, the ECMP path determination unit 16 and the path search execution request unit 17 serving as the path identification units have functions of separating the quality deterioration flow between the transmission source subnetwork and the destination subnetwork to a plurality of quality deterioration candidate flows, and cause the quality measurement unit 14 to perform a quality measurement for each of the separated quality deterioration candidate flows, thereby identifying the failure path of the quality deterioration flow.

Specifically, based on the quality measurement result for each quality deterioration candidate flow from the quality measurement unit 14, the ECMP path determination unit 16 and the path search execution request unit 17 serving as a path identification unit detect a quality deterioration candidate flow in which the deterioration of quality has occurred from among the plurality for quality deterioration candidate flows, and also perform a path search on one arbitrary flow in the detected quality deterioration candidate flows, thereby identifying the failure path of the quality deterioration flow.

In other words, based on the result of the quality measurement on the plurality of packets, the ECMP path determination unit 16 and the path search execution request unit 17 serving as the identification unit 11 identify which packet is a packet that is routed through the failure path, and perform a path search based on the information included in the identified packet, thereby identifying the failure path in the network 1.

Furthermore, the ECMP path determination unit 16 and the path search execution request unit 17 serving as the path identification unit hold the quality measurement result for each quality deterioration candidate flow, the quality measurement being performed by the quality measurement unit 14, as a table T4, and make a determination as to the occurrence of the quality deterioration for each quality deterioration candidate flow based on the table T4. Then, the determination result is held as a search path candidate table T3 in such a manner as to be associated with the transmission source IP address and the destination IP address corresponding to the quality deterioration candidate flow, and the failure path of the quality deterioration flow is identified based on the search path candidate table T3.

The ECMP path determination unit 16 and the path search execution request unit 17 serving as the identification unit 11 hold the results of the quality measurements of the plurality of estimated packets as a table T4, and identify which packet is a packet that is routed through the failure path based on the table T4. Then, the specific results are held as a search path candidate table T3 in such a manner as to be associated the transmission source and destination addresses corresponding to the plurality of estimated packets, and a path search is performed based on the search path candidate table T3, thereby identifying the failure path in the network 1.

In the manner described above, when a plurality of quality deterioration flows exist in the quality measurement result table T2 that is generated and updated by the quality measurement unit 14, the quality measurement unit 14 notifies the ECMP path determination unit 16 of the plurality of quality deterioration flows.

In this case, the ECMP path determination unit 16 and the path search execution request unit 17 serving as the path identification unit select one arbitrary quality deterioration flow from among the plurality of notified quality deterioration flows, and identify the failure path for the quality deterioration flow in accordance with the above-mentioned procedures.

After that, the path identification unit identifies the remaining quality deterioration flows one by one in accordance with the above-mentioned procedure in a similar manner.

The ECMP path determination unit 16 may store the search path candidate table T3 and the quality measurement result table T4 for each modulo, which are generated by the ECMP path determination unit 16, in the quality measurement result holding unit 15. Alternatively, the failure path monitoring apparatus 10 or the ECMP path determination unit 16 may be provided with a storage unit for storing the search path candidate table T3 and the quality measurement result table T4 for each modulo separately from the quality measurement result holding unit 15.

(A-3) Failure Path Identification Procedure in First Embodiment

Next, a description will be given, with reference to FIG. 14, of a failure path identification procedure in the first embodiment.

Figure 14:
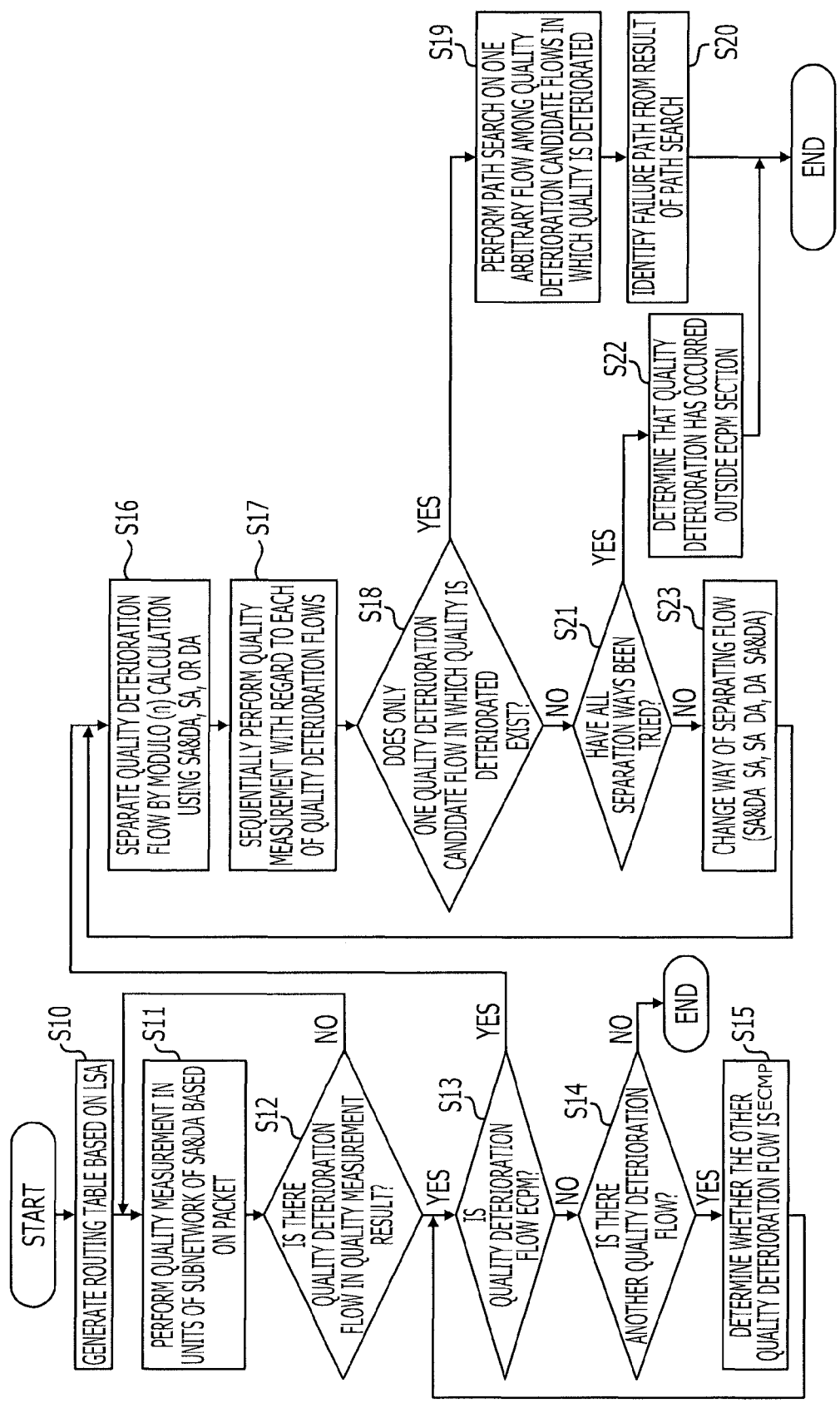
FIG. 14 illustrates an example of a failure path identification procedure in the failure path monitoring apparatus of the first embodiment.

FIG. 14 is a flowchart illustrating a failure path identification procedure in the failure path monitoring apparatus 10 of the first embodiment when a failure occurs among the routers C to E of the IP network 1 illustrated in FIG. 11.

Initially, the topology/path management unit 13 generates a routing table T1 based on the LSA information of OSPF, which is sent by the packet receiving unit 12 (S10).

Next, based on the packet sent from the packet receiving unit 12, the quality measurement unit 14 classifies the flow for each of the transmission source subnetwork and the destination subnetwork, and performs quality measurement for each flow (S11). At this time, the quality measurement results are stored in the quality measurement result table T2.

Then, based on the information on the number of lost packets of the quality measurement result, the quality measurement unit 14 confirms whether or not there is a quality deterioration flow in which the deterioration of quality of the packet has occurred (S12).

When the quality measurement unit 14 detects a quality deterioration flow, the quality measurement unit 14 notifies the ECMP path determination unit 16 of the quality deterioration flow (Yes in S12). When a plurality of quality deterioration flows exist, the quality measurement unit 14 notifies the ECMP path determination unit 16 of the plurality of quality deterioration flows.

On the other hand, when no quality deterioration flow in which the deterioration of quality of the packet has occurred exists (No in S12), the quality measurement unit 14 continuously performs quality measurement on the packet that is sent from the packet receiving unit (S11).

By referring to the routing table T1 that is managed by the topology/path management unit 13, the ECMP path determination unit 16 that is notified of the quality deterioration flow determines whether or not the quality deterioration flow is an ECMP or makes a determination as to the number of paths when the quality deterioration flow is an ECMP (S13).

At this time, when a plurality of quality deterioration flows are notified, the ECMP path determination unit 16 selects an arbitrary quality deterioration flow, and makes a determination as to the selected quality deterioration flow.

When the ECMP path determination unit 16 determines that the quality deterioration flow is not an ECMP (No in S13), the ECMP path determination unit 16 determines whether or not another quality deterioration flow that has been notified from the quality measurement unit 14 exists (S14).

When another quality deterioration flow exists (Yes in S14), the ECMP path determination unit 16 determines whether or not the other quality deterioration flow is an ECMP (S15 and S13). On the other hand, when another quality deterioration flow does not exist, it is possible to identify the failure path of the quality deterioration flow by a known technique. Consequently, the ECMP path determination unit 16 completes the failure path identification process of the ECMP section (No in S14).

A description will be given below of a case in which in S13, the ECMP path determination unit 16 determines whether or not the quality deterioration flow is an ECMP with regard to the quality deterioration flow from the transmission source subnetwork 10.0.0.0/8 to the destination subnetwork 13.0.0.0/8 among the quality deterioration flows notified from the quality measurement unit 14.

By referring to the routing table T1, the ECMP path determination unit 16 confirms that the quality deterioration flow is an ECMP, and the number of paths is 2 (Yes in S13).

Next, the ECMP path determination unit 16 performs a modulo (n) calculation using one of the transmission source IP address and the destination IP address, the transmission source IP address, and the destination IP address of the quality deterioration flow, and separates the quality deterioration flow to a plurality of quality deterioration candidate flows (S16).

Next, the ECMP path determination unit 16 causes the quality measurement unit 14 to sequentially perform quality measurement on each quality deterioration candidate flow of the modulos (0) to (n−1) based on the value of the selection paths 0 to n−1 of the field of the modulo (n) stored in the search path candidate table T3 (S17).

The procedure of the quality measurement for each quality deterioration candidate flow has already been described in the description of the operation of the ECMP path determination unit 16, and thus, the description of the details thereof is omitted.

Next, the ECMP path determination unit 16 confirms whether or not one typical quality deterioration candidate flow in which the quality measurement result is "1" (loss occurrence detected) exists from among a plurality of quality deterioration candidate flows based on the search path candidate table T3 that is generated by the quality measurement for each quality deterioration candidate flow by the quality measurement unit 14 and the ECMP path determination unit 16 (S18).

When no quality deterioration candidate flow in which the quality measurement result is "1" (loss occurrence detected) exists or when two or more quality measurement result is "1" (loss occurrence detected) exist (No in S18), the ECMP path determination unit 16 confirms that all the patterns of the transmission source IP address and the destination IP address, the transmission source IP address, and the destination IP address of the quality deterioration flow is used in the modulo (n) calculation when the quality deterioration flow is separated (S21).

When all the patterns have been used in the modulo (n) calculation in the case that the quality deterioration flow was separated (Yes in S21), the ECMP path determination unit 16 determines that the deterioration of quality of packets has occurred outside the ECMP section (S22), and the processing is completed.

On the other hand, when all the patterns have not been used in the modulo (n) calculation in the case that the quality deterioration flow was separated (No in S21), the ECMP path determination unit 16 separates once more the quality deterioration flow by using another pattern that was not used when the quality deterioration flow was separated (S23 and S16).

Here, regarding the change of the pattern, for example, when the transmission source IP address and the destination IP address are used during the earlier separation of the quality deterioration flow, the ECMP path determination unit 16 changes the pattern to a pattern using the transmission source IP address. Similarly, when the transmission source IP address is used during the earlier separation of the quality deterioration flow, the ECMP path determination unit 16 changes the pattern to a pattern using the transmission source IP address, and the source IP address and the destination IP address in the case that the destination IP address is used during the earlier separation of the quality deterioration flow.

The above-mentioned change is an example, and is not limited to this change order.

When it is determined in S18 that one typical quality deterioration candidate flow in which the quality measurement result is "1" (loss occurrence detected) exists (Yes in S18), the ECMP path determination unit 16 obtains, from the search path candidate table T3, the transmission source IP address and the destination IP address corresponding to the quality deterioration candidate flow in which is the quality measurement result is "1" (loss occurrence detected), and requests the path search execution request unit 17 to perform a path search for the IP address.

The path search execution request unit 17 causes the terminal 20 having the transmission source IP address in the IP network 1 to perform a path search for the destination IP address, and transmits the path search result to the ECMP path determination unit 16 (S19).

The ECMP path search unit 16 sets the path search result from the path search execution request unit 17 in the field of the path search result corresponding to the quality deterioration candidate flow of the search path candidate table T3, in which the quality result is "1" (loss occurrence detected).

With the above-mentioned procedures, the failure path monitoring apparatus 10 identifies the failure path of the quality deterioration flow (S20), and the processing is completed.

(A-4) Summary

As described above, according to the first embodiment, the quality deterioration flow is detected in units of the subnetwork by the quality measurement unit 14. Furthermore, as a result of a modulo (n) calculation by the ECMP path determination unit 16, the quality deterioration flow of an ECMP is separated to quality deterioration candidate flows for each path, and quality measurement for each quality deterioration candidate flow is performed by the quality measurement unit 14. Then, a path search is performed with a higher priority on a narrowed-down flow among the quality deterioration candidate flows in which the deterioration of quality has occurred (may also be one typical arbitrary narrowed-down flow), and the path of the quality deterioration candidate flow in which the deterioration of quality has occurred is identified.

That is, the quality measurement unit 14 and the ECMP path determination unit 16 separate the quality deterioration flow that is an ECMP for each path routed by the router in practice, and perform quality measurement once more for each quality deterioration candidate flow, thereby making it possible to accurately identify the path in which the quality deterioration has occurred.

Furthermore, between the transmission source subnetwork and the destination subnetwork in which the deterioration of quality has occurred, a path search may not be performed for each of all the transmission source IP addresses and destination IP addresses. Consequently, it is possible to shorten the time desired for the path search, and it is possible to identify the failure path of the ECMP section in a short time.

Furthermore, an extra measurement load is not given to the IP network 1 except the monitoring of a packet in the IP network 1 by the quality measurement unit 14, and a path search for one arbitrary flow. Consequently, it is possible to suppress a load on the IP network 1, and it is possible to identify the failure path of the ECMP section.

(A-5) First Modification of First Embodiment

Quality measurement for each quality deterioration candidate flow by the quality measurement unit 14 in the first embodiment is not limited to the above-mentioned procedure, and for example, may be performed in the following manner.

First, in accordance with the above-mentioned procedure, the ECMP path determination unit 16 separates the quality deterioration flow to N quality deterioration candidate flows of modulos (0) to (n−1) (see S10 to S16 of FIG. 14).

By referring to the field of the transmission source IP address/destination IP address corresponding to the modulo (0) of the search path candidate table T3, that is, the selection path 0, the ECMP path determination unit 16 reads the transmission source IP address and the destination IP address, and notifies the quality measurement unit 14 of the read IP addresses so as to make a request for quality measurement.

The quality measurement unit 14 extracts a packet in which the transmission source IP address and the destination IP address are the transmission source IP address and the destination IP address received from the ECMP path determination unit 16 from among the plurality of packets received from the packet receiving unit 12, and performs quality measurement on the extracted packet.

In the following, in accordance with the above-mentioned procedure, the ECMP path determination unit 16 sets the quality measurement result regarding the quality deterioration candidate flow of the modulo (0) in the search path candidate table T3 and the quality measurement result table T4 for each modulo.

Hereinafter, similarly, the quality measurement unit 14 performs quality measurement for the quality deterioration candidate flow of modulos (1) to (n−1) based on the transmission source IP address and the destination IP address received from the ECMP path determination unit 16. The ECMP path determination unit 16 sets the quality measurement result of each quality deterioration candidate flow in the search path candidate table T3 and the quality measurement result table T4 for each modulo.

In the following, in accordance with the above-mentioned procedure, the failure path monitoring apparatus 10 identifies the failure path of the quality deterioration flow (see S18 to S23 of FIG. 14).

In the manner described above, the ECMP path determination unit 16 and the path search execution request unit 17 serving as the path identification unit of the first modification of the first embodiment notify the quality measurement unit 14 of the transmission source IP addresses and the destination IP addresses of the plurality of packets that are extracted when the quality deterioration flow is separated to a plurality of quality deterioration candidate flows. Then, the quality measurement unit 14 of the first modification of the first embodiment performs quality measurement based on the information of the packet, in which the transmission source IP address and the destination IP address are the notified transmission source IP address and the destination IP address, among the plurality of packets received by the packet receiving unit 12.

In other words, the quality measurement unit 14 and the ECMP path determination unit 16 serving as the identification unit 11 perform quality measurement based on the information of the packet, in which the transmission source addresses and destination addresses are the transmission source addresses and the destination addresses of the plurality of packets that are extracted when a plurality of packets are estimated from among the received packets received by the packet receiving unit 12, that is, when the quality deterioration flow is separated to a plurality of quality deterioration candidate flows.

As described above, according to the first modification of the first embodiment, the quality measurement unit 14 performs quality measurement for each quality deterioration candidate flow of modulos (0) to (n−1) based on the transmission source IP address and the destination IP address stored in the search path candidate table T3.

As a result, in addition to the effect in the first embodiment, it is possible for the ECMP path determination unit 16 to reduce the load in the failure path monitoring apparatus 10 because it is sufficient that a modulo (n) calculation is performed typically when the quality deterioration flow is separated to a plurality of quality deterioration candidate flows. Furthermore, it is possible to identify in a shorter time the path in which the deterioration of quality has occurred in an ECMP.

(A-6) Second Modification of First Embodiment

The separation of the quality deterioration flow by the ECMP path determination unit 16 and the quality measurement by the quality measurement unit 14 for each quality deterioration candidate flow in the first embodiment are not limited to the above-mentioned procedures, and may be performed, for example, in the following manner.

Figure 15:
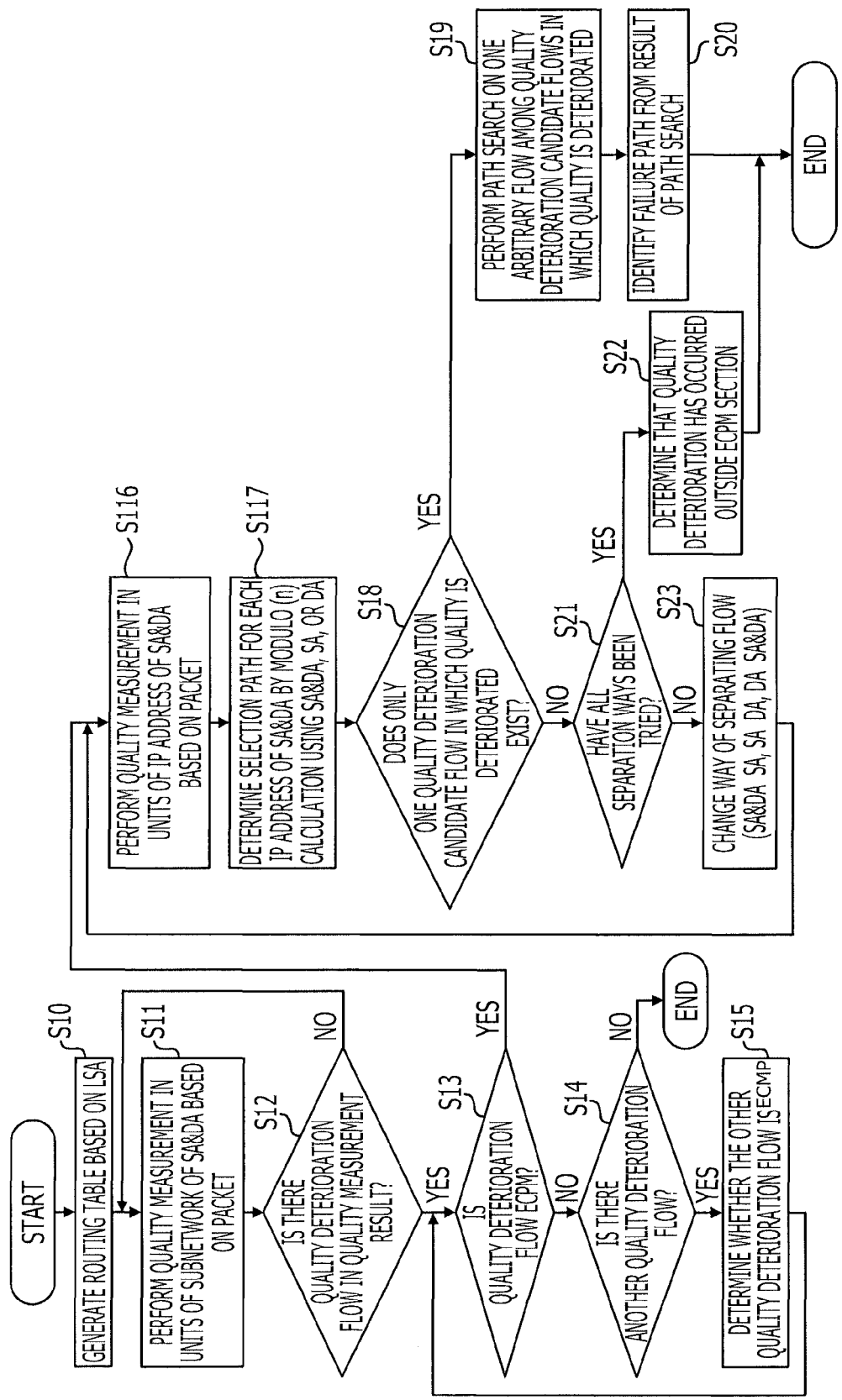
FIG. 15 illustrates a modification of the failure path identification procedure in the failure path monitoring apparatus of the first embodiment.

FIG. 15 is a flowchart illustrating a modification of the failure path identification procedure in the failure path monitoring apparatus 10 of the first embodiment when a failure has occurred among the routers C to E in the IP network 1 illustrated in FIG. 11. In the procedure of the modification illustrated in FIG. 15, in place of S16 and S17 of FIGS. 14, S116 and S117 are performed.

The operations designated with the same reference numerals as the already mentioned reference numerals in the figures indicate the same or substantially the same operations, and thus, a part of the description thereof is omitted.

A description will be given below of a case in which the ECMP path determination unit 16 determines that the quality deterioration flow is an ECMP.

When it is determined by the ECMP path determination unit 16 that the quality deterioration flow is an ECMP (Yes in S13), the ECMP path determination unit 16 generates a search path candidate table T3 with regard to the quality deterioration flow, illustrated in FIG. 12, and a quality measurement result table T4 for each modulo illustrated in FIG. 13. Then, in each table, the ECMP path determination unit 16 sets the transmission source subnetwork and the destination subnetwork of the target quality deterioration flow in the fields of the transmission source subnetwork and the destination subnetwork, and sets a selection path in the field of the modulo (n).

Next, the ECMP path determination unit 16 requests the quality measurement unit 14 to perform a quality measurement for each IP address on the packet of the quality deterioration flow.

Upon reception of this request, the quality measurement unit 14 extracts a packet in which the transmission source IP address and the destination IP address are the transmission source IP address and the destination IP address included in the transmission source subnetwork and the destination subnetwork of the quality deterioration flow from among the plurality of packets received from the packet receiving unit 12, classifies the extracted packets to a flow for each of the transmission source IP address and the destination IP address, and measures the quality of each flow (S116).

The ECMP path determination unit 16 receives, from the quality measurement unit 14, the quality measurement result with regard to the flow for each of the transmission source IP address and the destination IP address. A modulo (n) calculation is performed on each of the plurality of sets of received transmission source IP address and the destination IP address. Then, it is determined which one of the selection paths has been assigned to the flow of the transmission source IP address and the destination IP address from among the selection paths 0 to n−1 (S117).

At this time, the ECMP path determination unit 16 sets, in the quality measurement result table T4 for each modulo, the quality measurement result with regard to the flow of the transmission source IP address and the destination IP address corresponding to the selection path determined by the modulo (n) calculation.

Furthermore, the ECMP path determination unit 16 sets the transmission source IP address and the destination IP address corresponding to the selection path in the field of the transmission source IP address/destination IP address of the search path candidate table T3. In addition, the ECMP path determination unit 16 sets "0" (loss occurrence undetected) or "1" (loss occurrence detected) in the field of the quality measurement result based on the quality measurement result of the search path candidate table T3 with regard to the flow of the transmission source IP address and the destination IP address corresponding to the selection path. Therefore, in accordance with the above-mentioned procedure, the quality deterioration candidate flows corresponding to the selection paths 0 to n−1 are obtained.

In the following, the failure path monitoring apparatus 10 identifies the failure path of the quality deterioration flow in accordance with the procedure at and subsequent to S18.

As described above, according to the second modification of the first embodiment, the ECMP path determination unit 16 receives the quality measurement result with regard to the flow for each of the transmission source IP address and the destination IP address in the quality deterioration flow, and determines which one of the selection paths of 0 to n−1 each flow corresponds to by a modulo (n) calculation. Then, based on the determined result, the information, such as the IP address of each flow and the quality measurement result, is set in the search path candidate table T3 and the quality measurement result table T4 for each modulo.

As a result, in addition to the effect in the first embodiment, it is possible to reduce the load in the failure path monitoring apparatus 10 because it is sufficient that the ECMP path determination unit 16 performs a modulo (n) calculation typically when the ECMP path determination unit 16 separates the flow for each of the transmission source IP address and the destination IP address in the quality deterioration flow to a plurality of quality deterioration candidate flows. Furthermore, it is possible to identify in a shorter time the path in which the deterioration of quality has occurred in an ECMP.

(B) Second Embodiment

Quality measurement for each of the transmission source subnetwork and the destination subnetwork by the quality measurement unit 14, the separation of the quality deterioration flow by the ECMP path determination unit 16, and quality measurement for each quality deterioration candidate flow by the quality measurement unit 14 in the first embodiment are not limited to the above-mentioned procedures. For example, the above may be performed as in a second embodiment to be described below with reference to FIGS. 16 to 18.

Figure 16:
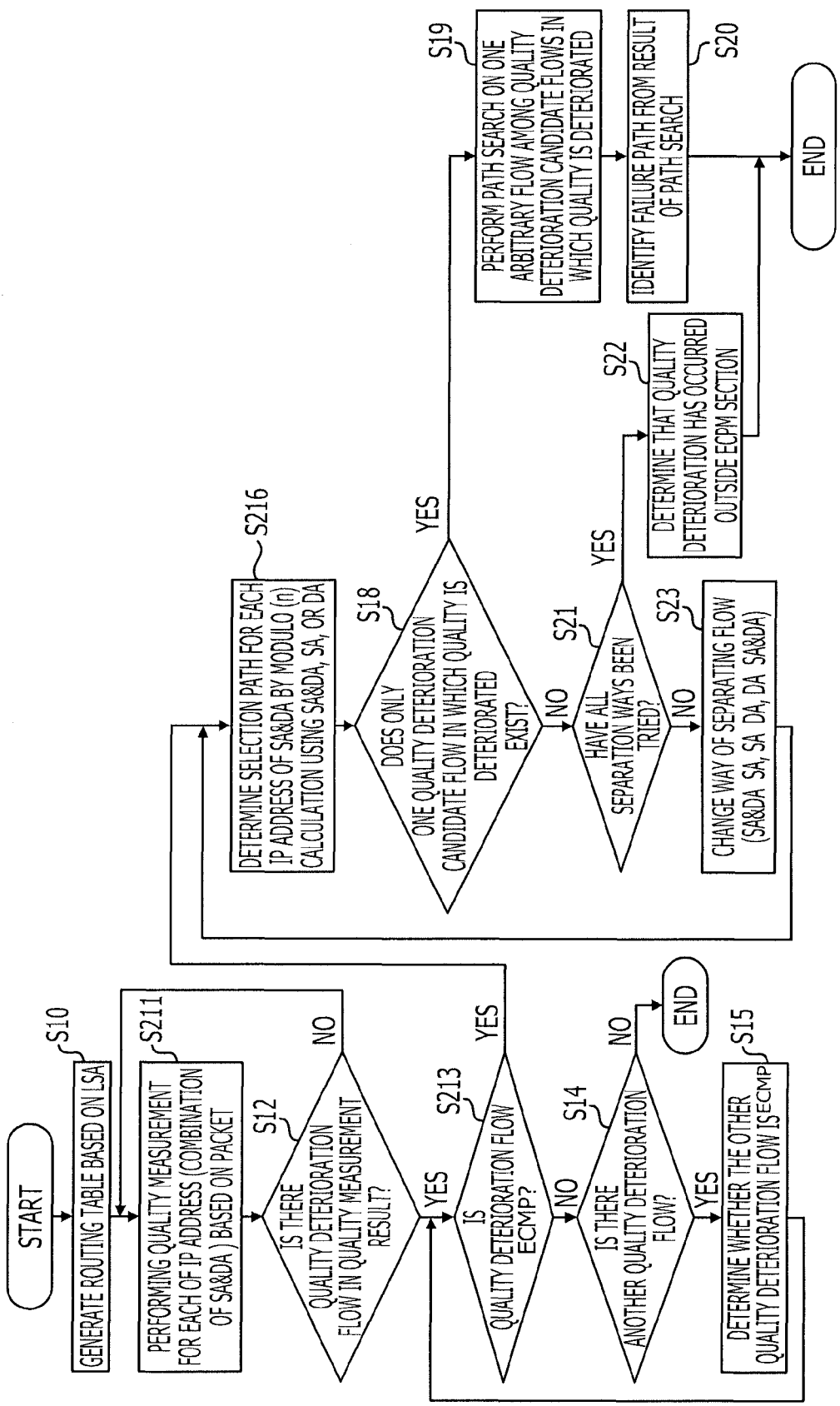
FIG. 16 illustrates an example of a failure path identification procedure in a failure path monitoring apparatus according to a second embodiment of the present invention.

FIG. 16 is a flowchart illustrating a failure path identification procedure in the failure path monitoring apparatus 10 of the second embodiment when a failure occurs among the routers C to E of the IP network 1 illustrated in FIG. 11. In the procedure of the second embodiment illustrated in FIG. 16, in place of S11 and S13 of FIGS. 14, S211 and S213 are performed, and in place of S16 and S17 of FIG. 14, S216 is performed. In the following, the operations designated with the same reference numeral as the already mentioned reference numerals in FIG. 16 indicate the same or substantially the same operations. Accordingly, a part of the description thereof is omitted.

FIG. 17 illustrates a quality measurement result table T12 in the IP network 1 illustrated in FIG. 4, which is generated and updated by the quality measurement unit 14 of the failure path monitoring apparatus 10 of the second embodiment.

FIG. 18 illustrates a search path candidate table T13 in the IP network 1 illustrated in FIG. 4, which is generated by the ECMP path determination unit 16 of the failure path monitoring apparatus 10 of the second embodiment.

Initially, in accordance with the above-mentioned procedures, the topology/path management unit 13 generates a routing table T1 based on the LSA information of OSPF that is sent from the packet receiving unit 12 (S10).

Next, based on the packet that is sent from the packet receiving unit 12, the quality measurement unit 14 classifies the flow for each of the transmission source IP address and the destination IP address, and performs quality measurement on each flow (S211). Furthermore, the quality measurement result is stored in the quality measurement result table T12 illustrated in FIG. 17. In the quality measurement result table T12 illustrated in FIG. 17, typically some of sets of the transmission source IP address and the destination IP address are displayed, and the illustration of the other sets of the transmission source IP address and the destination IP address is omitted.

Then, when the quality measurement unit 14 detects a quality deterioration flow based on the quality measurement result for each of the transmission source IP address and the destination IP address in accordance with the above-mentioned procedure, the quality measurement unit 14 notifies the ECMP path determination unit 16 of the quality deterioration flow (Yes in S12). When a plurality of quality deterioration flows exist, the quality measurement unit 14 notifies the ECMP path determination unit 16 of the plurality of quality deterioration flows.

Next, by referring to the routing table T1 managed by the topology/path management unit 13, the ECMP path determination unit 16 determines whether or not the quality deterioration flow is an ECMP, and makes a determination as to the number of paths when the quality deterioration flow is an ECMP (S213).

At this time, when a plurality of quality deterioration flows are notified, the ECMP path determination unit 16 selects an arbitrary quality deterioration flow, and makes a determination as to the selected quality deterioration flow.

When it is determined that the selected quality deterioration flow is not an ECMP (No in S213), it is determined whether or not there is another quality deterioration flow that has been notified from the quality measurement unit 14 in accordance with the above-mentioned procedure (S14). When there is another quality deterioration flow (Yes in S14), it is determined whether or not the other quality deterioration flow is an ECMP (S15 and S213).

A description will be given below of a case in which the ECMP path determination unit 16 determines whether or not the quality deterioration flow is an ECMP in S213 regarding the quality deterioration flow of the transmission source IP address 10.0.0.4 and the destination IP address 13.0.0.6 among the quality deterioration flows notified from the quality measurement unit 14.

By referring to the routing table T1, the ECMP path determination unit 16 confirms that the quality deterioration flow is an ECMP and the number of paths is 2 (Yes in S213).

Next, the ECMP path determination unit 16 generates a search path candidate table T13 illustrated in FIG. 18, sets the transmission source subnetwork 10.0.0.0/8 and the destination subnetwork 13.0.0.0/8 in which the quality deterioration flow is included in the fields of the transmission source subnetwork and the destination subnetwork, and sets the selection path of 0 and 1 in the field of modulo (n) based on the number (n) of paths of ECMP.

Next, the ECMP path determination unit 16 obtains a selection path corresponding to the quality deterioration flow by performing a modulo (n) calculation using the transmission source IP address and the destination IP address, the transmission source IP address, or the destination IP address of the quality deterioration flow. Furthermore, based on the selection path obtained by the modulo (n) calculation, the ECMP path determination unit 16 sets the transmission source IP address and the destination IP address of the quality deterioration flow in the fields of the transmission source IP address and the destination IP address corresponding to the selection path of the search path candidate table T13. Furthermore, the ECMP path determination unit 16 sets "1" (loss occurrence detected) in the field of the quality measurement result corresponding to the selection path of the search path candidate table T13.

In the example illustrated in FIG. 18, a selection path 1 is obtained by the modulo (n) calculation using the transmission source IP address and the destination IP address with regard to the quality deterioration flow of the transmission source IP address and the destination IP address.

Furthermore, the ECMP path determination unit 16 performs a modulo (n) calculation by referring to the transmission source IP address and the destination IP address, the transmission source IP address, or the destination IP address of another flow (it does not matter whether or not the flow is a quality deterioration flow), which are included in the transmission source subnetwork and the destination subnetwork that are the same as those of the quality deterioration flow based on the quality measurement result table T12 illustrated in FIG. 17, thereby obtaining a selection path corresponding to the other flow. Furthermore, by referring to the quality measurement result of the other flow of the quality measurement result table T12, the ECMP path determination unit 16 sets "0" (loss occurrence undetected) or "1" (loss occurrence detected) in the corresponding field of the quality measurement result of the search path candidate table T13.

In the example illustrated in FIG. 18, as the other flow, the flow of the transmission source IP address: 10.0.0.1 and the destination IP address: 13.0.0.2 is referred to, and a selection path 0 is obtained by the modulo (n) calculation using the transmission source IP address and the destination IP address with regard to the other flow. Furthermore, the ECMP path determination unit 16 sets the "0" (loss occurrence undetected) in the field of the quality measurement result corresponding to the selection path of the other flow of the search path candidate table T13.

As described above, the ECMP path determination unit 16 performs a modulo (n) calculation regarding the quality deterioration flow, and performs a modulo (n) calculation regarding another flow included in the transmission source subnetwork and the destination subnetwork, which are the same as those of the quality deterioration flow based on the quality measurement result table T12 until the flows corresponding to all the selection paths of the number (n) of paths of ECMP are obtained (S216). Therefore, the quality deterioration candidate flows corresponding to the selection paths 0 to n−1 are obtained in accordance with the above-mentioned procedures.

In the following, the failure path monitoring apparatus 10 identifies the failure path of the quality deterioration flow in accordance with the procedure at and subsequent to S18 above.

In the manner described above in the second embodiment, by referring to the quality measurement result of the quality deterioration measurement table T12, the ECMP path determination unit 16 and the path search execution request unit 17 serving as the path identification unit separate the flow between the transmission source subnetwork and the destination subnetwork in which the quality deterioration flow is included to a plurality of quality deterioration candidate flows. Then, based on the plurality of separated quality deterioration candidate flows and the quality measurement results, a path search request is performed on one arbitrary flow in the quality deterioration flows, thereby identifying the failure path of the quality deterioration flow.

As described above, according to the second embodiment, the quality measurement unit 14 performs quality measurement in units of the transmission source IP address and the destination IP address. Consequently, it is unnecessary to perform a quality measurement for each quality deterioration candidate flow after the quality deterioration flow is separated by the ECMP path determination unit 16.

As a result, in addition to the effect in the first embodiment, it is possible to reduce the load in the failure path monitoring apparatus 10 because it is sufficient that the quality measurement unit 14 performs quality measurement typically when the quality deterioration flow is to be detected. Furthermore, it is possible to identify the path in which the deterioration of quality has occurred in an ECMP in a shorter time.

(C) others

In the foregoing, the preferred embodiments of the present invention have been described in detail. However, the present invention is not limited to such specific embodiments, and various modifications and changes may be made without departing from the spirit and scope of the present invention.

For example, as described with reference to FIGS. 19 to 23, the number of paths of the quality deterioration flow in the IP network 1 of the first embodiment and the second embodiment is 2. However, the number of paths of ECMP may be 3 or more.

Figure 19:
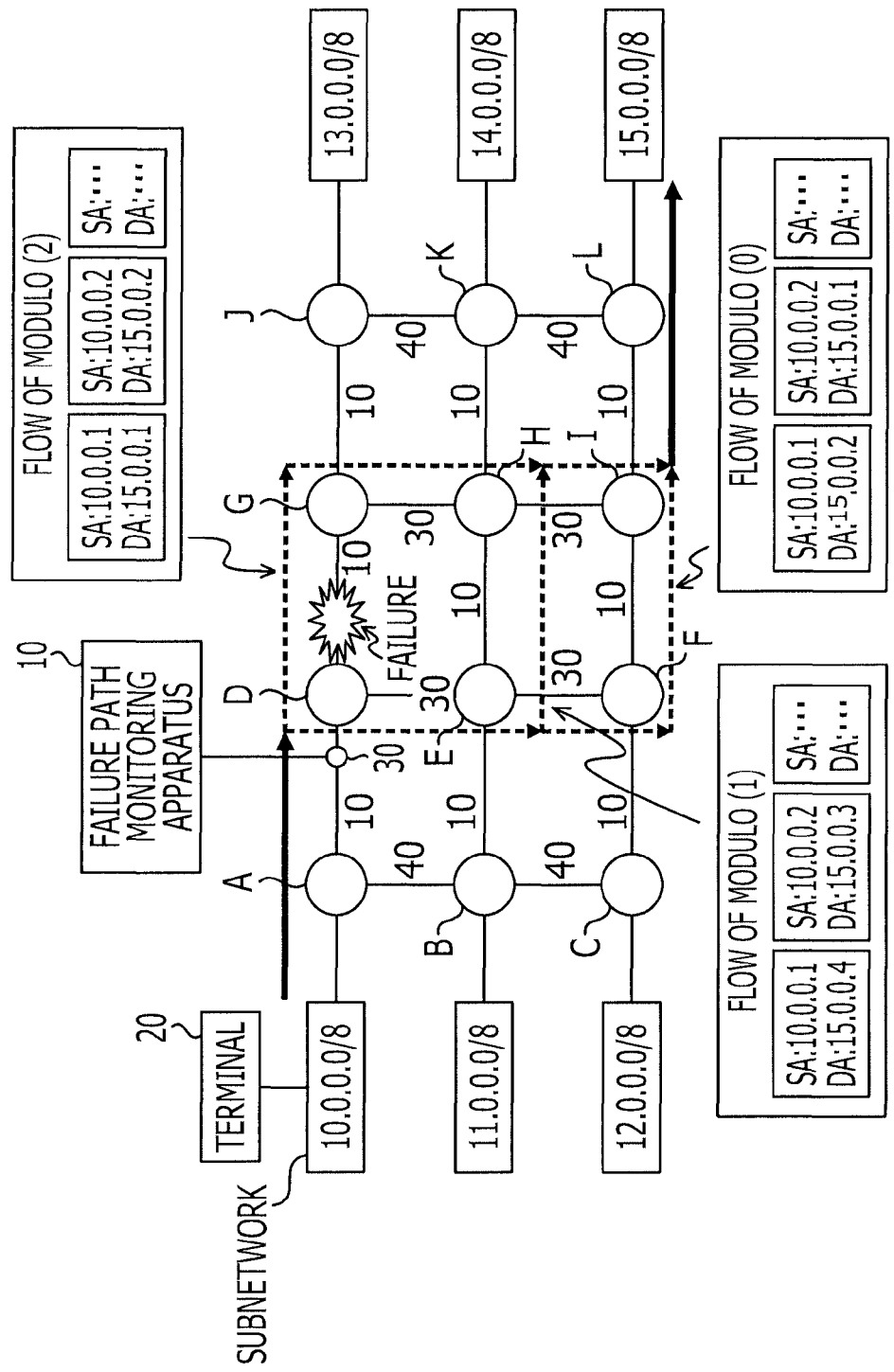
FIG. 19 illustrates the path of a flow that is routed by a router in an IP network when a failure occurs among routers.
Figure 24:
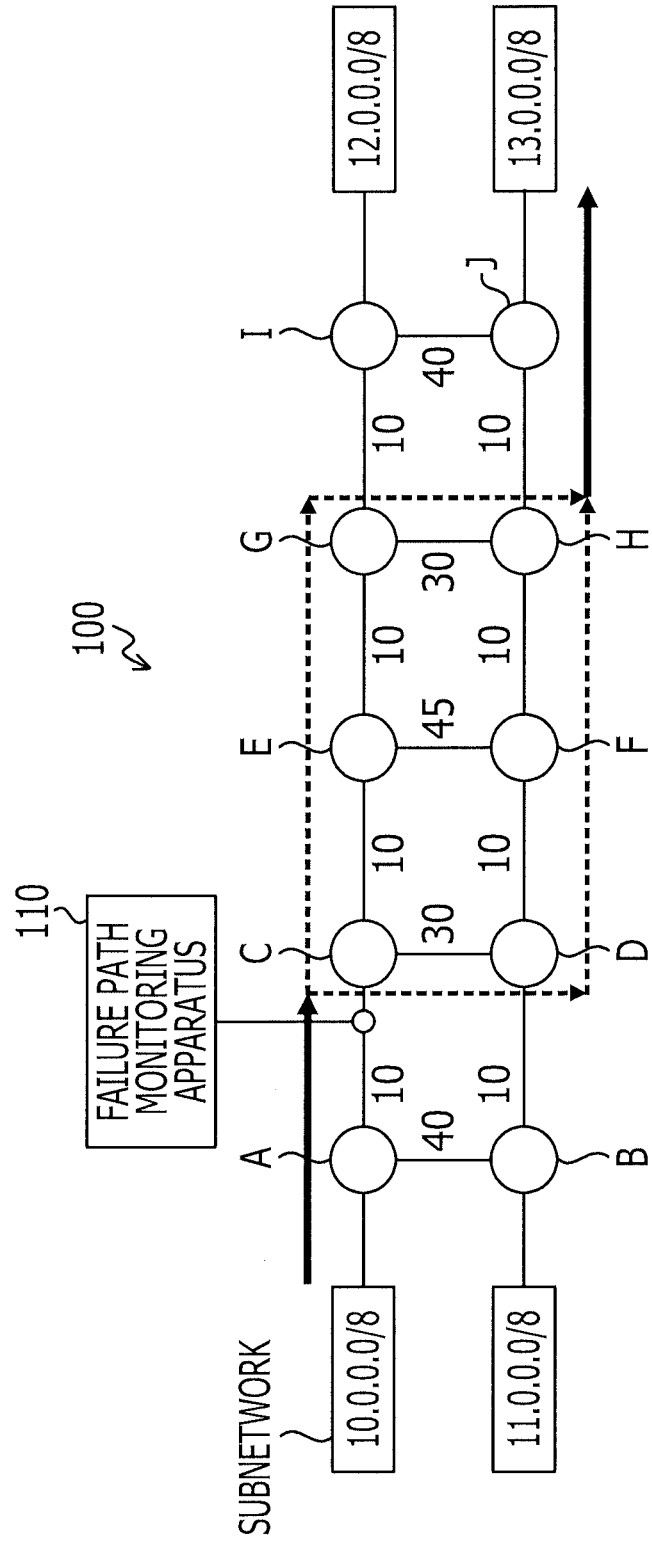
FIG. 24 illustrates an example of a typical IP network.

FIG. 19 illustrates the path of a flow, which is routed by a router in the IP network 2, when a failure occurs among the routers D to G.

FIGS. 20 to 23 illustrate a routing table T21, a quality measurement result table T22, a search path candidate table T23, and a quality measurement result table T24 for each modulo in the failure path monitoring apparatus 10, respectively.

For example, when a failure occurs among the routers D to G of the IP network 2 illustrated in FIG. 19, the routing table T21, the quality measurement result table T22, the search path candidate table T23, and the quality measurement result table T24 for each modulo, which are illustrated in FIGS. 20 to 23, are generated. For the sake of convenience, in FIGS. 20 and 21, the typical information on the transmission source subnetwork 10.0.0.0/8 and the destination subnetwork 15.0.0.0/8 is described, and the illustration of the information on the other transmission source subnets and destination subnets is omitted.

In this case, for example, the quality deterioration flow from the transmission source subnetwork 10.0.0.0/8 to the destination subnetwork 15.0.0.0/8 is an ECMP, and the number of paths is 3.

In such a configuration of the IP network 2, it is possible to apply the failure path identification procedures in the above-mentioned first embodiment and the second embodiment.

The functions as the identification unit 11, the packet receiving unit 12, the topology/path management unit 13, the quality measurement unit 14, the ECMP path determination unit 16, and the path search execution request unit 17 may be realized by executing a certain application program serving as a failure path identification program by a computer (including a CPU, an information processing device, and various terminals).

Then, as a result of executing a failure path identification program by the CPU (not illustrated) of the failure path monitoring apparatus 10, the failure path identification program functions as the identification unit 11, the packet receiving unit 12, the topology/path management unit 13, the quality measurement unit 14, the ECMP path determination unit 16, and the path search execution request unit 17 in the failure path monitoring apparatus 10 configured as described above.

The program is provided in a form in which the program is recorded on a computer-readable recording medium such as, for example, a flexible disc, a CD (CD-ROM, CD-R, CD-RW, etc.), or a DVD (DVD-ROM, DVD-RAM, DVD-R, DVD-RW, DVD+R, DVD+RW, etc.). In this case, the computer reads a storage unit control program from the recording medium, transfers it to an internal storage device or an external storage device, and stores the program for use. Alternatively, the program may be pre-recorded on a storage device (recording medium), such as, for example, a magnetic disc, an optical disc, or a magneto-optical disc, so that the program may be provided from the storage device to the computer through a communication line.

Here, the computer is a concept including a hardware and an OS (operating system), and means hardware that operates under the control of the OS. Furthermore, when an OS is unnecessary and hardware is made to operate by an application program by itself, the hardware corresponds to the computer. The hardware includes at least a microprocessor, such as a CPU, and a means for reading a computer program recorded on a recording medium.

The application program as the failure path identification program includes program codes for allowing the computer such as that described above to realize the functions. Furthermore, some of the functions may be realized by the OS rather than by the application program.

According to an aspect of the embodiments of the invention, any combinations of one or more of the described features, functions, operations, and/or benefits can be provided. A combination can be one or a plurality. As described, the embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the failure path monitoring apparatus 10, etc.) can comprise a controller (CPU) (e.g., a hardware logic circuitry based computer processor that processes or executes instructions, namely software/program), computer readable media, transmission communication interface (network interface), and/or an output device, for example, a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

A program/software implementing the embodiments may be recorded on a computer-readable media, e.g., a non-transitory medium. The program/software implementing the embodiments may be transmitted over a transmission communication path, e.g., a wire and/or a wireless network implemented via hardware.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A monitoring apparatus that identifies a failure path in a network including a relay device, the monitoring apparatus comprising:
   a memory; and
   a processor coupled to the memory and configured to:
      receive packets that are transmitted in the network,
      detect a deterioration of quality of a flow between a transmission source subnetwork and a destination subnetwork, the flow corresponding to a received packet from among the received packets, based on information included in the received packets,
      when the flow is determined to be an equivalent cost multi path (ECMP), separate the flow to a plurality of selection paths by using a routing rule used when the relay device routes a path of the ECMP,
      perform a quality measurement for each of the selection paths, and
      identify a failure path among the selection paths based on the quality measurement,
      wherein the routing rule is based on a result of a modulo calculation using a transmission source address and a destination address of the received packet in which the deterioration of quality has been detected.

2. The monitoring apparatus according to claim 1, wherein the processor is configured to:
   extract a plurality of the received packets from among the received packets in which the transmission source address and the destination address of the extracted plurality of received packets are included in the transmission source subnetwork and the destination subnetwork, and
   perform the modulo calculation using the transmission source address and the destination address of each of the extracted plurality of received packets.

3. The monitoring apparatus according to claim 1, wherein the processor is configured to:

receive path control information for controlling a path, which includes connection information related to the relay device and cost information, generate a routing table based on the path control information, when deterioration of quality between the transmission source subnetwork and the destination subnetwork of the received packet is detected, determine whether there are a plurality of transmission paths between the transmission source subnetwork and the destination subnetwork based on the routing table, and when determined that there are a plurality of transmission paths between the transmission source subnetwork and the destination subnetwork, determine that the flow is the ECMP.

4. The monitoring apparatus according to claim 1, wherein based on the quality measurement for the received packet, the processor identifies which packet is a packet that is routed through the failure path, and performs a path search based on the information included in the identified packet, thereby identifying the failure path in the network.

5. The monitoring apparatus according to claim 1, wherein the processor is configured to:

perform a quality measurement between the transmission source subnetwork and the destination subnetwork of the received packet based on the information included in the received packet and detect the deterioration of quality of the received packet, when deterioration of quality for the received packet is detected, identify a plurality of packets that are routed through different paths from among plurality of transmission paths between the transmission source subnetwork and the destination subnetwork based on the transmission source address or the destination address, and perform a quality measurement for the identified plurality of packets, thereby identifying which packet is a packet that is routed through the failure path.

6. The monitoring apparatus according to claim 1, wherein the ECMP is a section in the network in which an open shortest path first (OSPF) is used.

7. The monitoring apparatus according to claim 2, wherein the processor is configured to:

perform a modulo calculation on each of the extracted plurality of received packets, and when result of the modulo calculation on at least one of the extracted plurality of received packets corresponds to a result of the modulo calculation on the received packet for which quality measurement has been performed and in which the deterioration of quality has been detected, perform quality measurement based on the transmission source and destination addresses of the received packet used for the modulo calculation.

8. The monitoring apparatus according to claim 2, wherein the processor is configured to, when one of the extracted plurality of received packets that was routed through the failure path cannot be identified and/or cannot determine that one of the extracted plurality of received packets that is identified to have been routed through two or more different paths is a packet that was routed through the failure path, re-extract a plurality of received packets to be routed through different paths based on a result of another modulo calculation.

9. The monitoring apparatus according to claim 3, wherein the processor is configured to:

when the deterioration of quality between the transmission source subnetwork and the destination subnetwork of the received packet is detected, calculate a number of transmission paths between the transmission source subnetwork and the destination subnetwork and extract a plurality of the received packets that are routed through different paths from among the transmission paths of the calculated number of paths based on the routing table.

10. The monitoring apparatus according to claim 4, wherein the processor holds results of the quality measurement for a plurality of identified packets as a table, identifies which packet is a packet that is routed through a failure path based on the table, holds the packet identification results as a search path candidate table in such a manner as to be associated with a transmission source address and a destination address corresponding to the plurality of identified packets, and performs a path search based on the search path candidate table, thereby identifying the failure path in the network.

11. The monitoring apparatus according to claim 5, wherein the memory is configured to hold results of quality measurement, and the processor is configured to:

store results of the quality measurement between the transmission source subnetwork and the destination subnetwork of the received packet as a quality measurement result table in the memory, and detect the deterioration of quality for the received packet based on the quality measurement result table.

12. The monitoring apparatus according to claim 7, wherein the processor is configured to perform a quality measurement based on information regarding at least one of the plurality of packets in which a transmission source and destination addresses are the transmission source address and the destination address of the extracted plurality of received packets from among the received packets.

13. The monitoring apparatus according to claim 11, wherein the processor is configured to apply a clear operation to the quality measurement result table at a certain period or under a condition in which a failure is reduced.

14. A monitoring method of identifying a failure path in a network including a relay device, the monitoring method comprising:

receiving packets that are transmitted in a network;

detecting a deterioration of quality of a flow between a transmission source subnetwork and a destination subnetwork, the flow corresponding to a received packet from among the received packets, based on information included in the received packets;

when the flow is determined to be an equivalent cost multi path (ECMP), separating the flow to a plurality of selection paths by using a routing rule used when the relay device routes a path of the ECMP;

performing a quality measurement for each of the selection paths; and identifying a failure path among the selection paths based on the quality measurement, wherein the routing rule is based on a result of a modulo calculation using one of a transmission source address and a destination address of the received packet in which the deterioration of quality has been detected.

15. A non-transitory computer-readable medium storing a program for causing a computer to perform processing for identifying a failure path in a network including a relay device, the processing comprising:

receiving packets that are transmitted in a network, detecting a deterioration of quality of a flow between a transmission source subnetwork and a destination subnetwork, the flow corresponding to a received packet from among the received packets, based on information included in the received packets, when the flow is determined to be an equivalent cost multi path (ECMP), separating the flow to a plurality of selection paths by using a routing rule used when the relay device routes a path of the ECMP, performing a quality measurement for each of the selection paths, and identifying a failure path among the selection paths based on the quality measurement, wherein the routing rule is based on a result of a modulo calculation using one of a transmission source address and a destination address of the received packet in which the deterioration of quality has been detected.

* * * * *